United States Patent
Ichiki

(10) Patent No.: US 9,979,311 B2
(45) Date of Patent: May 22, 2018

(54) MATRIX CONVERTER

(71) Applicant: FUJITSU GENERAL LIMITED, Kanagawa (JP)

(72) Inventor: Satoshi Ichiki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 0 days. days.

(21) Appl. No.: 14/762,781

(22) PCT Filed: Jan. 22, 2014

(86) PCT No.: PCT/JP2014/051290
§ 371 (c)(1),
(2) Date: Jul. 22, 2015

(87) PCT Pub. No.: WO2014/115777
PCT Pub. Date: Jul. 31, 2014

(65) Prior Publication Data
US 2015/0372610 A1    Dec. 24, 2015

(30) Foreign Application Priority Data

Jan. 23, 2013    (JP) ................................ 2013-010583

(51) Int. Cl.
*H02M 5/293*    (2006.01)
*H02M 7/219*    (2006.01)

(52) U.S. Cl.
CPC .... *H02M 5/293* (2013.01); *H02M 2005/2932* (2013.01); *H02M 2007/2195* (2013.01); *Y02B 70/1408* (2013.01)

(58) Field of Classification Search
CPC .......... H02M 1/088; H02M 1/12; H02M 1/32; H02M 2001/0003; H02M 2001/0025;
(Continued)

(56) References Cited

U.S. PATENT DOCUMENTS 7,701,740 B2 *    4/2010    Yamanaka ............ H02M 5/297
                                                    363/149
7,881,087 B2 *    2/2011    Sakakibara ........... H02M 5/275
                                                    363/159
(Continued)

FOREIGN PATENT DOCUMENTS

CN    101432956 A    5/2009
CN    101867300 A    10/2010
(Continued)

OTHER PUBLICATIONS

Itoh, Jun-Ichi, Ikuya Sato, Hideki Ohguchi, Kazuhisa Sato, Akihiro Odaka, Naoya Eguchi; "A Control Method for the Matrix Converter Based on Virtual AC/DC/AC Conversion Using Carrier Comparison Method"; Jun. 10, 2005; Electrical Engineering in Japan; vol. 152; Issue 3; pp. 65-73.*

(Continued)

*Primary Examiner* — Emily P Pham
*Assistant Examiner* — Shahzeb K Ahmad
(74) *Attorney, Agent, or Firm* — McDermott Will & Emery LLP

(57) ABSTRACT

Disclosed is a matrix converter that directly converts input three-phase AC power into three-phase AC power and outputs the converted three-phase AC power to a load. The matrix converter includes: a bidirectional switch circuit that switches on or off the supply of the three-phase AC power to the load; and a controller that performs different virtual AC/DC conversion processes according to a plurality of modes which are divided depending on magnitude correlation between respective phase voltages in the input three-phase AC power, with respect to the input three-phase AC power, selects two phases from the input three-phase AC power, and generates switching patterns of the bidirectional switch circuit so as to perform the different DC/AC conver-
(Continued)

sion processes according to the plurality of modes with respect to line voltages of the two selected phases.

7 Claims, 23 Drawing Sheets

(58) Field of Classification Search
CPC .......... H02M 2001/385; H02M 5/293; H02M 5/271; H02M 5/4585; H02M 5/297; H02M 2005/2932; H02M 2005/2935; H02M 2005/2937; H02K 47/30; H01F 30/14
See application file for complete search history.

(56) References Cited

U.S. PATENT DOCUMENTS

| | | | |
|---|---|---|---|
| 8,817,505 B2 | 8/2014 | Ichiki | |
| 8,885,377 B2 * | 11/2014 | Yamamoto | H02M 5/297 363/148 |
| 8,941,350 B2 * | 1/2015 | Otsuka | H02M 5/293 318/685 |
| 8,964,424 B2 * | 2/2015 | Sakakibara | H02M 5/297 363/37 |

FOREIGN PATENT DOCUMENTS

| | | |
|---|---|---|
| CN | 102598497 A | 7/2012 |
| EP | 2017947 A1 | 1/2009 |
| EP | 2251968 A1 | 11/2010 |
| JP | 2005-168198 A | 6/2005 |
| JP | 2006-014550 A | 1/2006 |
| JP | 2006014550 | * 12/2006 |
| JP | 2007-006564 A | 1/2007 |
| JP | 2008-283774 A | 11/2008 |
| JP | 2011-30409 A | 2/2011 |
| KR | 10-2012-0126009 A | 11/2012 |
| WO | WO2010150909 | * 12/2010 |

OTHER PUBLICATIONS

Written Opinion of the International Searching Authority PCT/JP2014/051290 dated Apr. 28, 2014.
Jun-ichi Itoh et al., "A Control Method for the Matrix Converter Based on Virtual AC/DC/AC Conversion Using Carrier Comparison Method", IEEJ Trans. IA, vol. 124, No. 5, 2004, pp. 457-463 w/English Abstract.
International Search Report PCT/JP2014/051290 dated Apr. 28, 2014 with English translation.
English Translation, Written Opinion of the International Searching Authority PCT/JP2014/051290 dated Apr. 28, 2014.
Notice of Rejection Japanese Patent Application No. 2014-126642 dated Apr. 21, 2015 with English translation.
Notice of Rejection Japanese Patent Application No. 2013-010583 dated Apr. 22, 2014 with English translation.
Extended European Search Report EP Application No. 14743725.5 dated Nov. 16, 2016.
Young-Doo Yoon et al., "Carrier-Based Modulation Technique for Matrix Converter", IEEE Transactions on Power Electronics, vol. 21, No. 6, Nov. 2006, pp. 1691-1703.
Hidenori Hara et al., "Improvement of Output Voltage Control Performance for Low Speed Operation of Matrix Converter", 35th Annual IEEE Power Electronics Specialists Conference, Aachen Germany, 2004, pp. 2910-2916.
Office Action Korean Patent Application No. 10-2015-7019969 dated Mar. 1, 2017 with full English translation.
Office Action Chinese Patent Application No. 201480016318.7 dated Mar. 29, 2017 with English translation.

* cited by examiner

[FIG. 1]
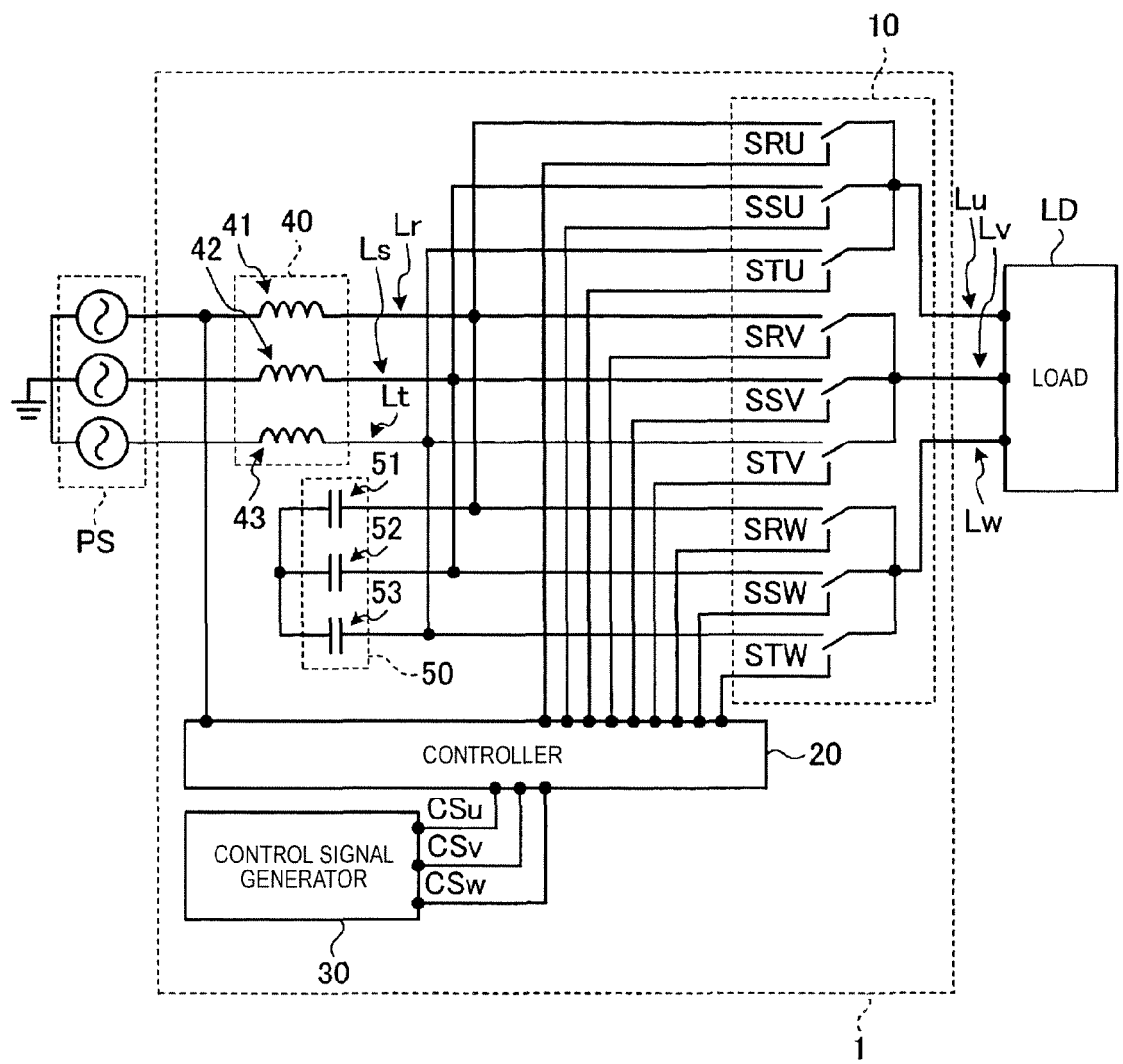

[FIG. 2A]
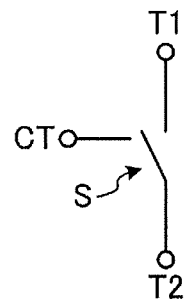
[FIG. 2B]
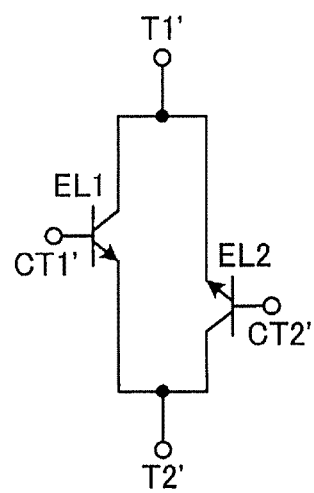
[FIG. 2C]
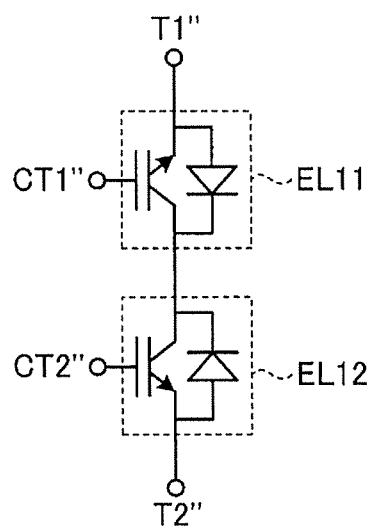

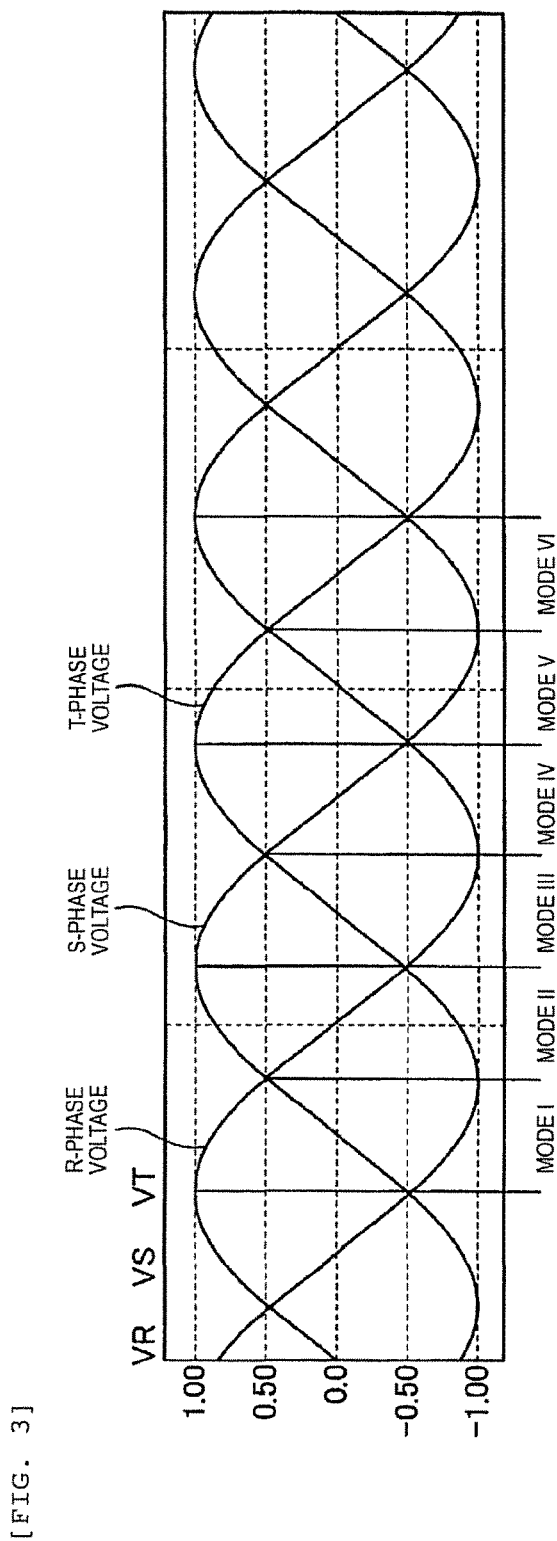
[FIG. 3]

[FIG. 4A]
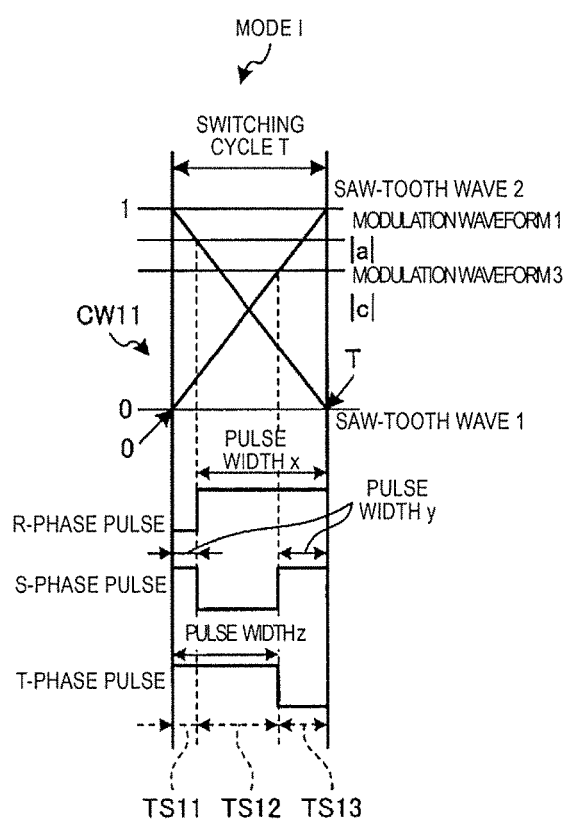

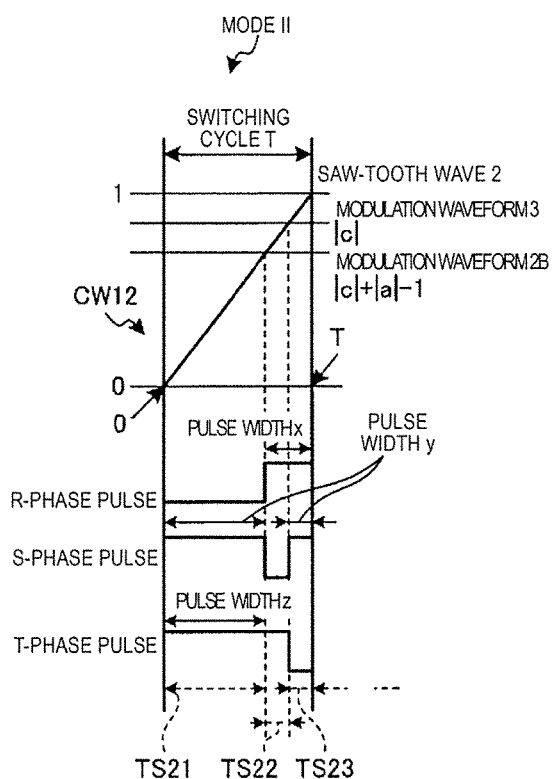
[FIG. 4B]

[FIG. 4C]
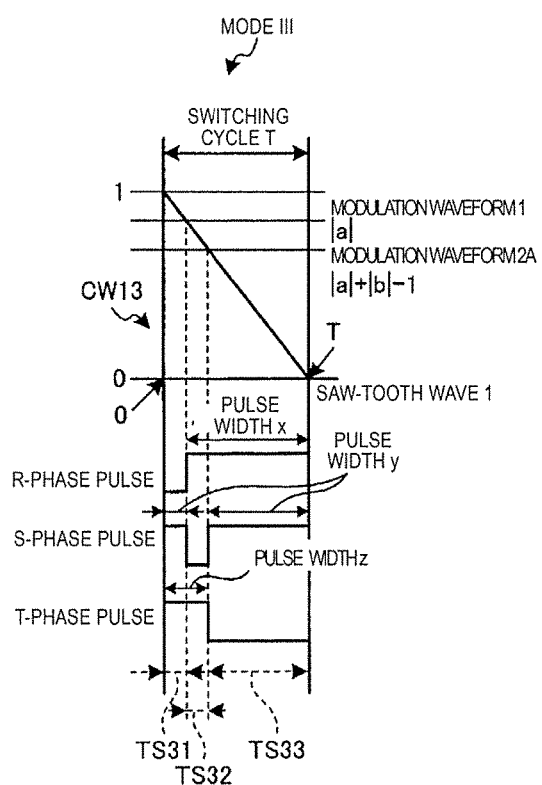

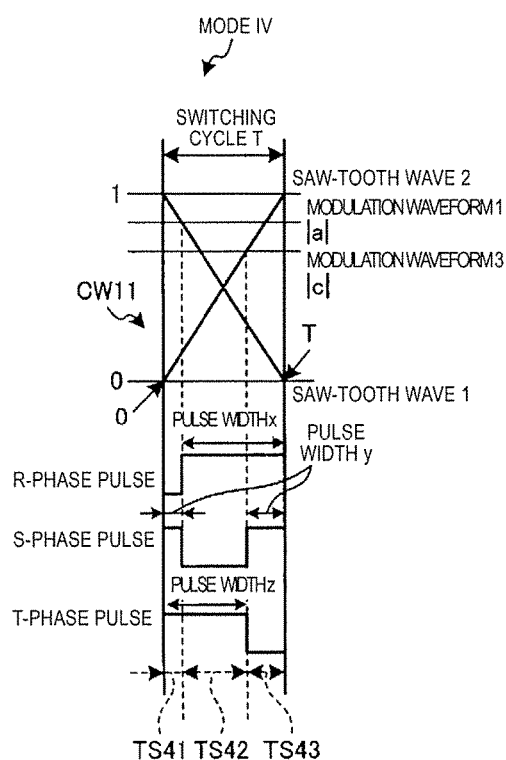
[FIG. 4D]

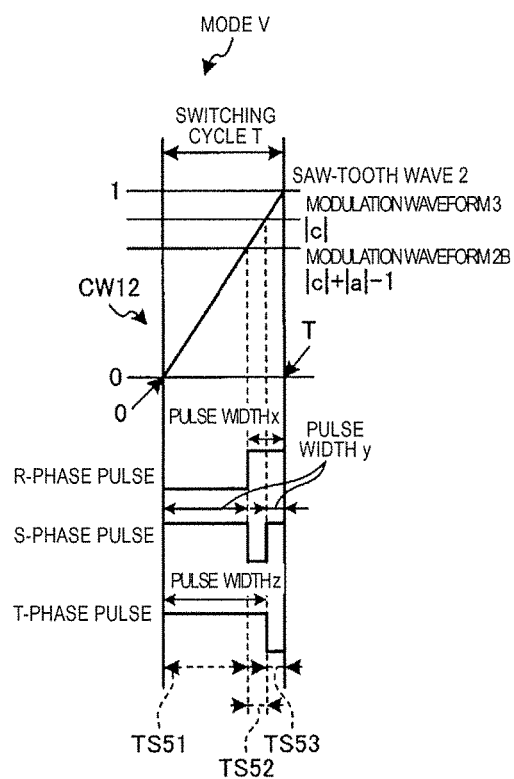
[FIG. 4E]

[FIG. 4F]
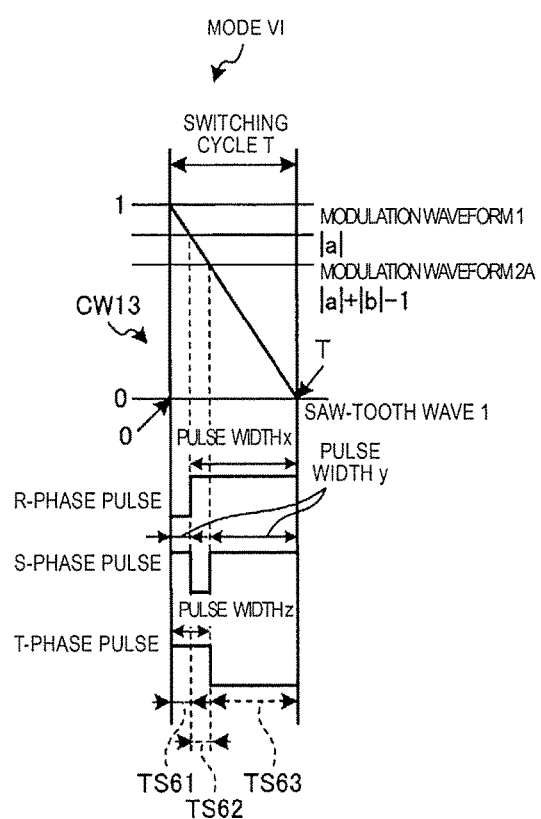

[FIG. 5A]
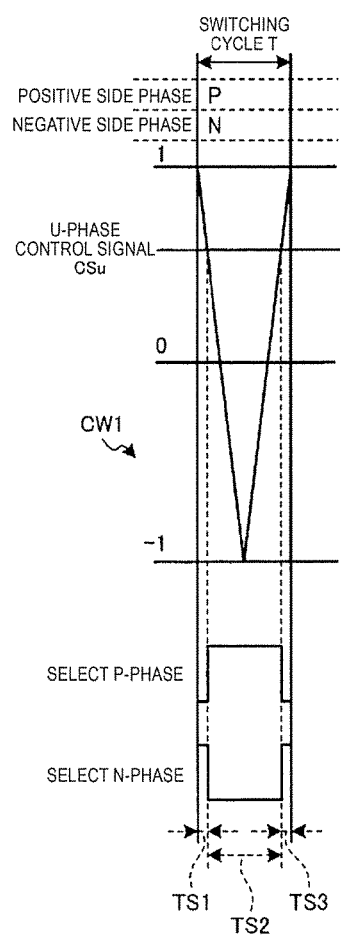

[FIG. 5B]
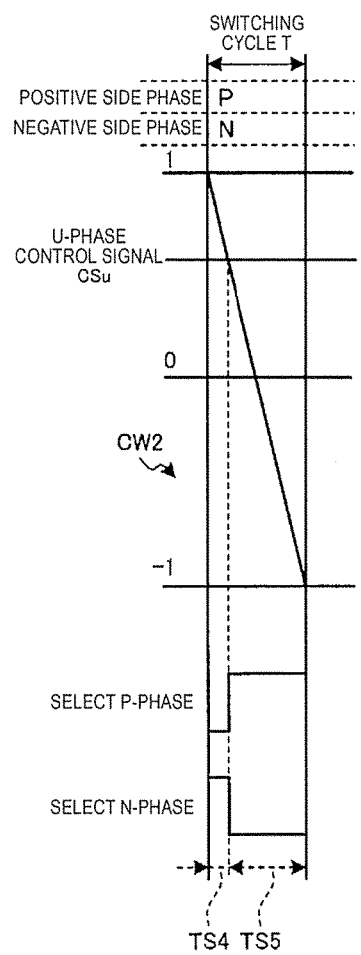

[FIG. 5C]
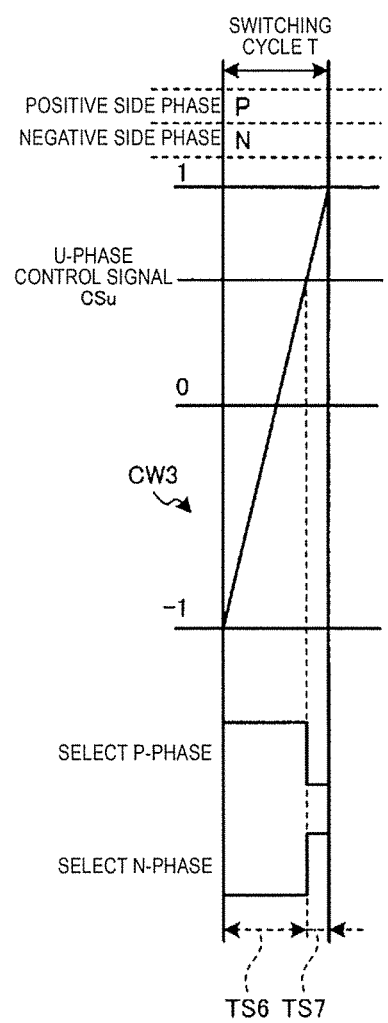

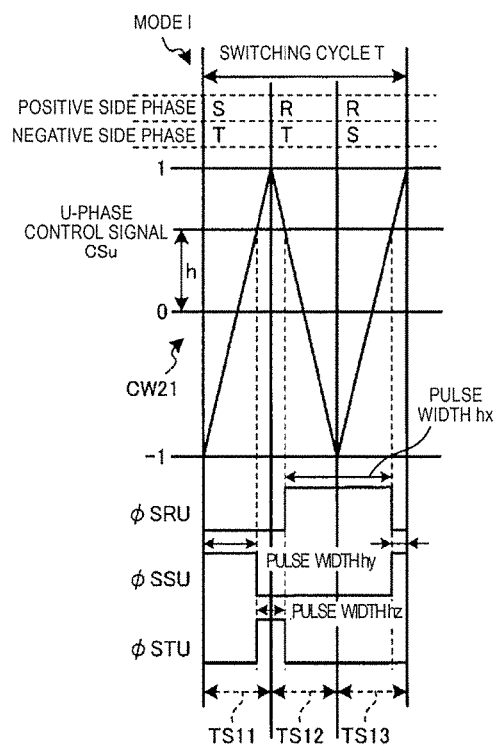
[FIG. 6A]

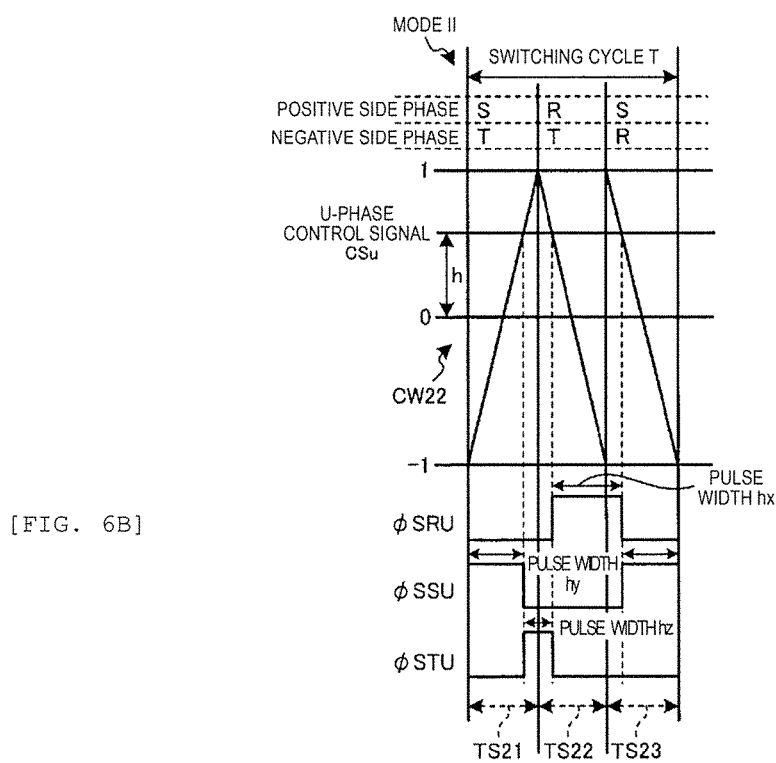
[FIG. 6B]

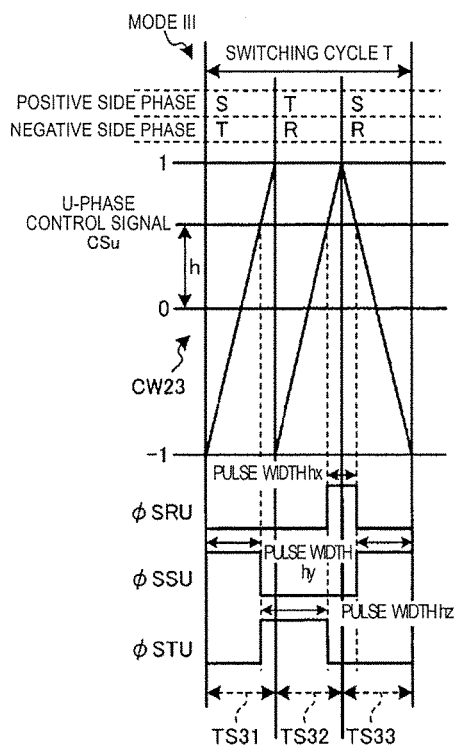
[FIG. 6C]

[FIG. 6D]
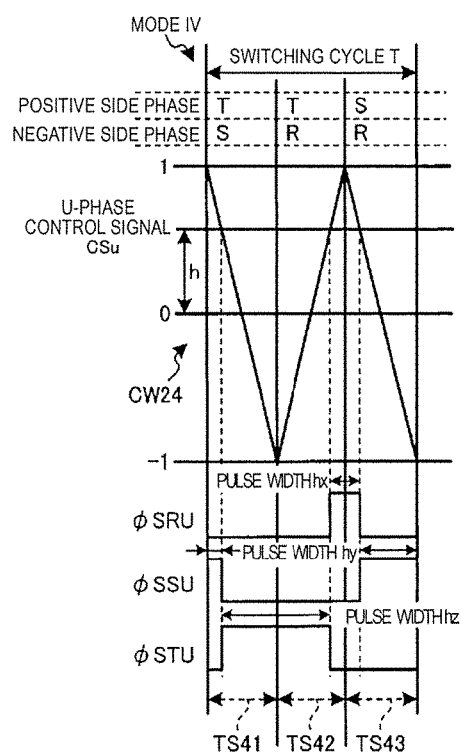

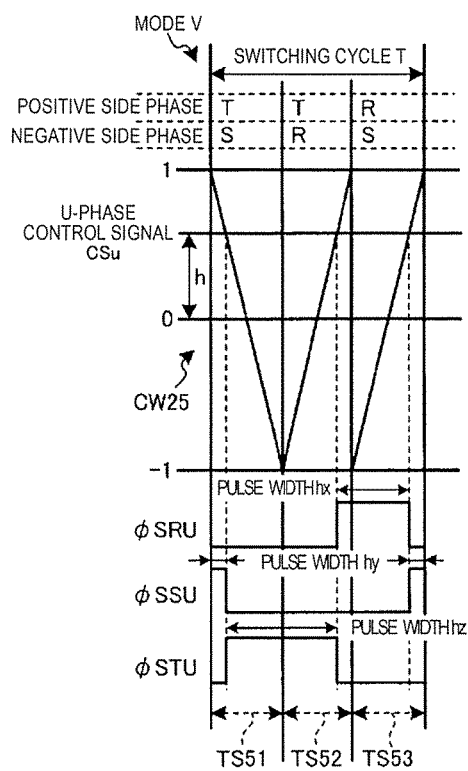
[FIG. 6E]

[FIG. 6F]
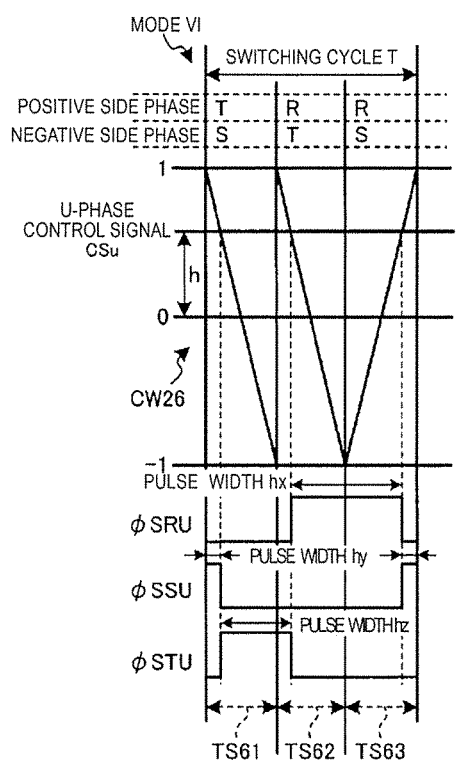

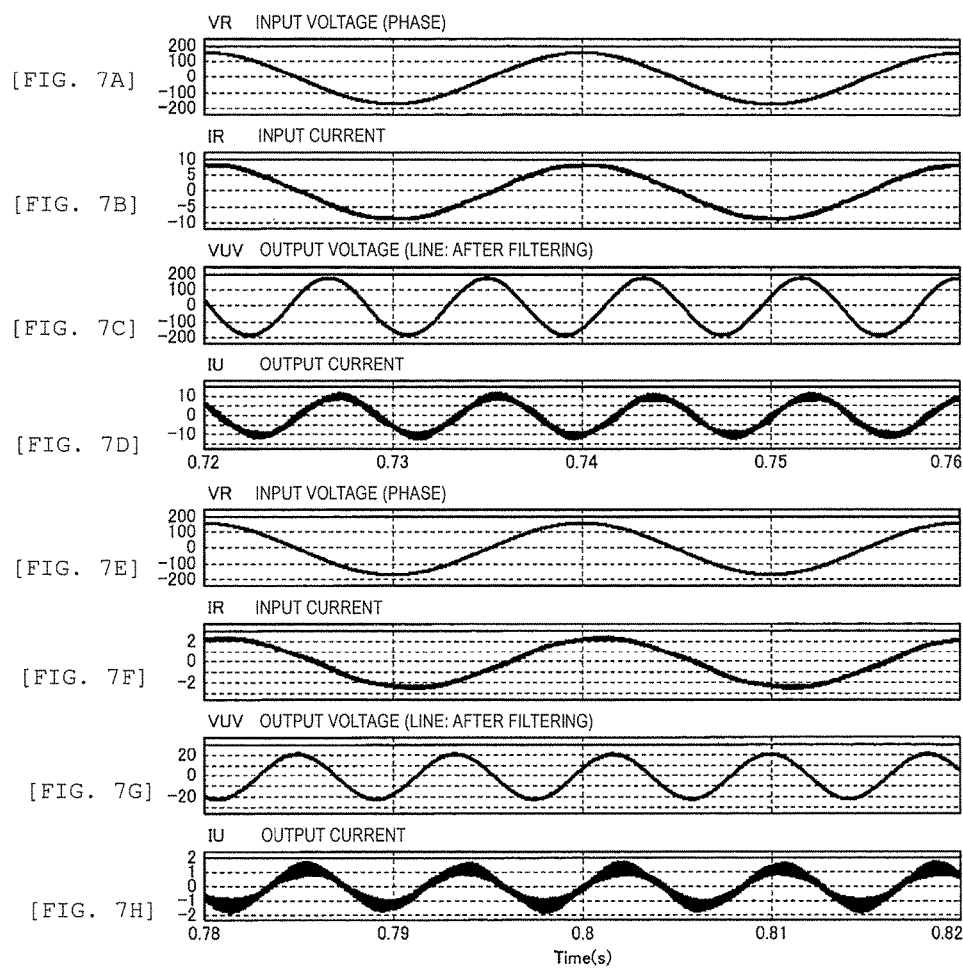

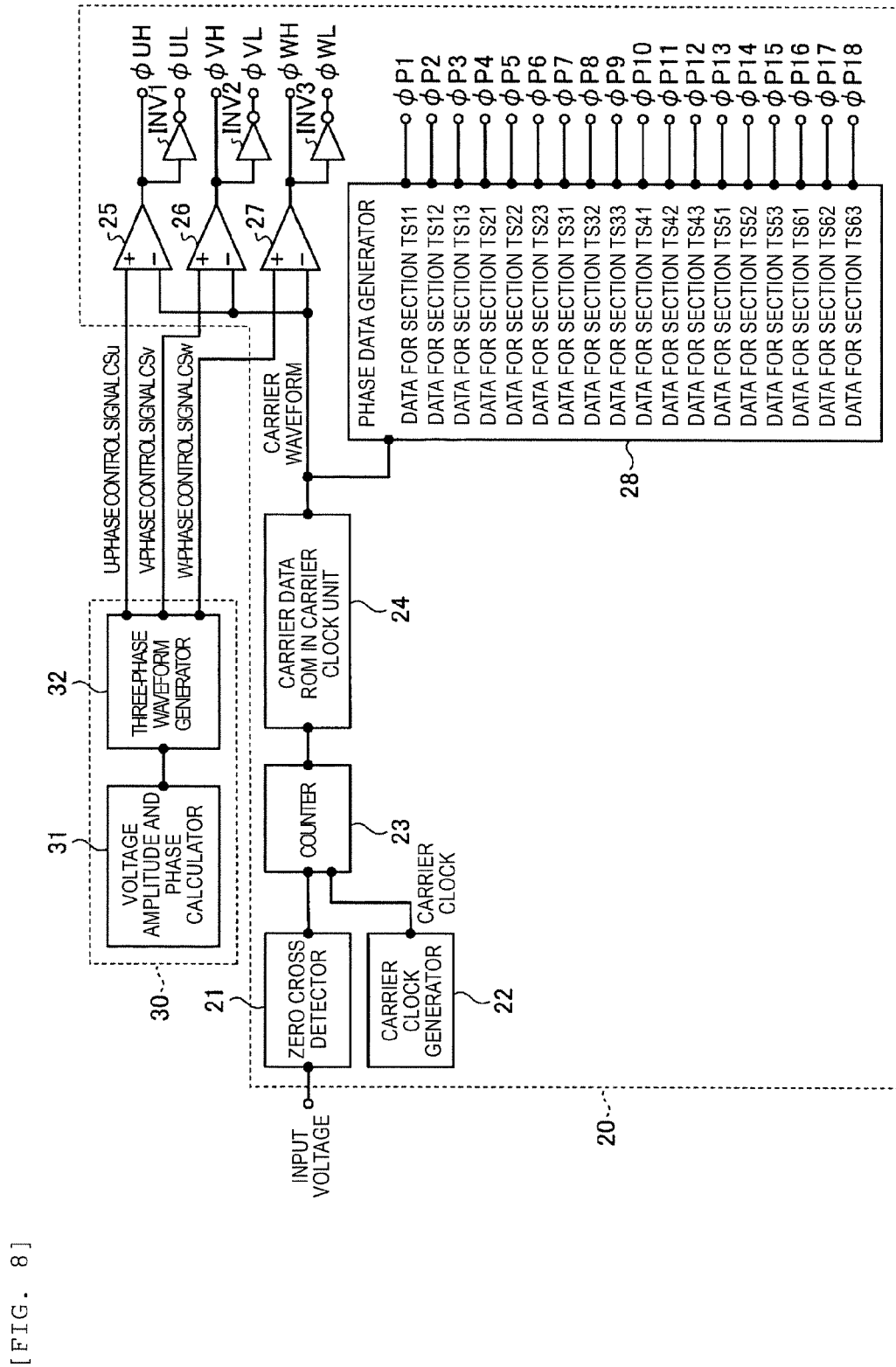
[FIG. 8]

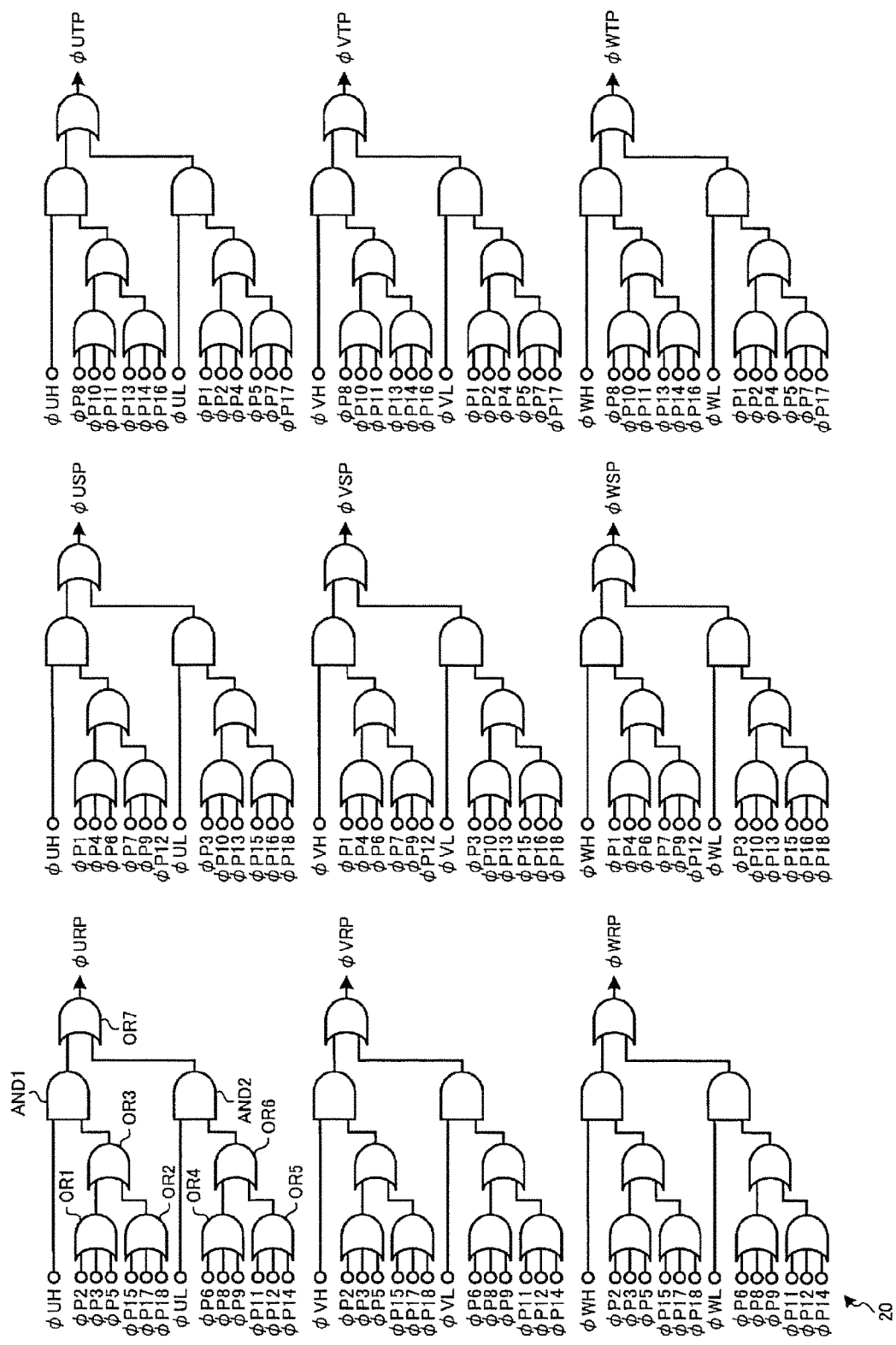
[FIG. 9]

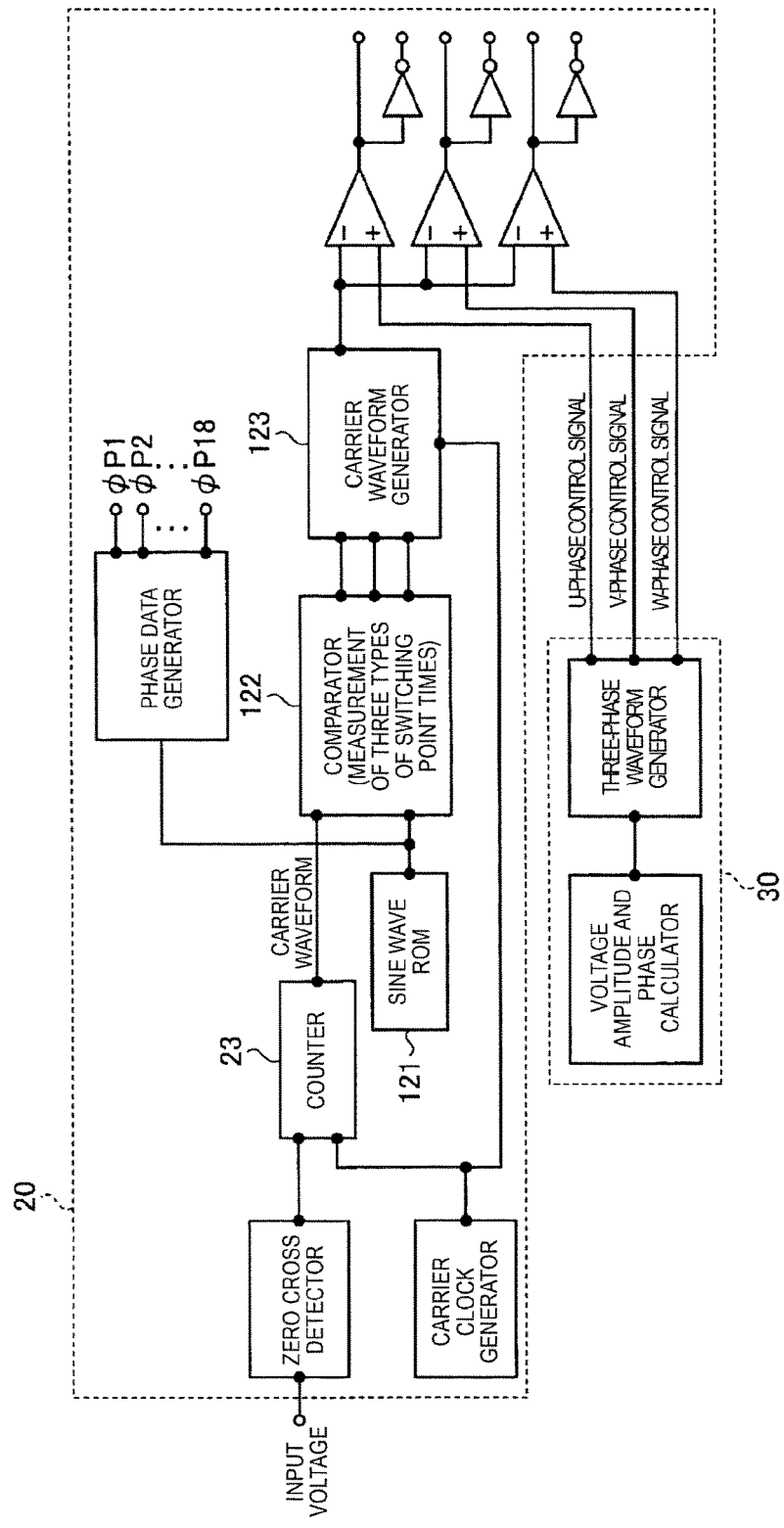
[FIG. 10]

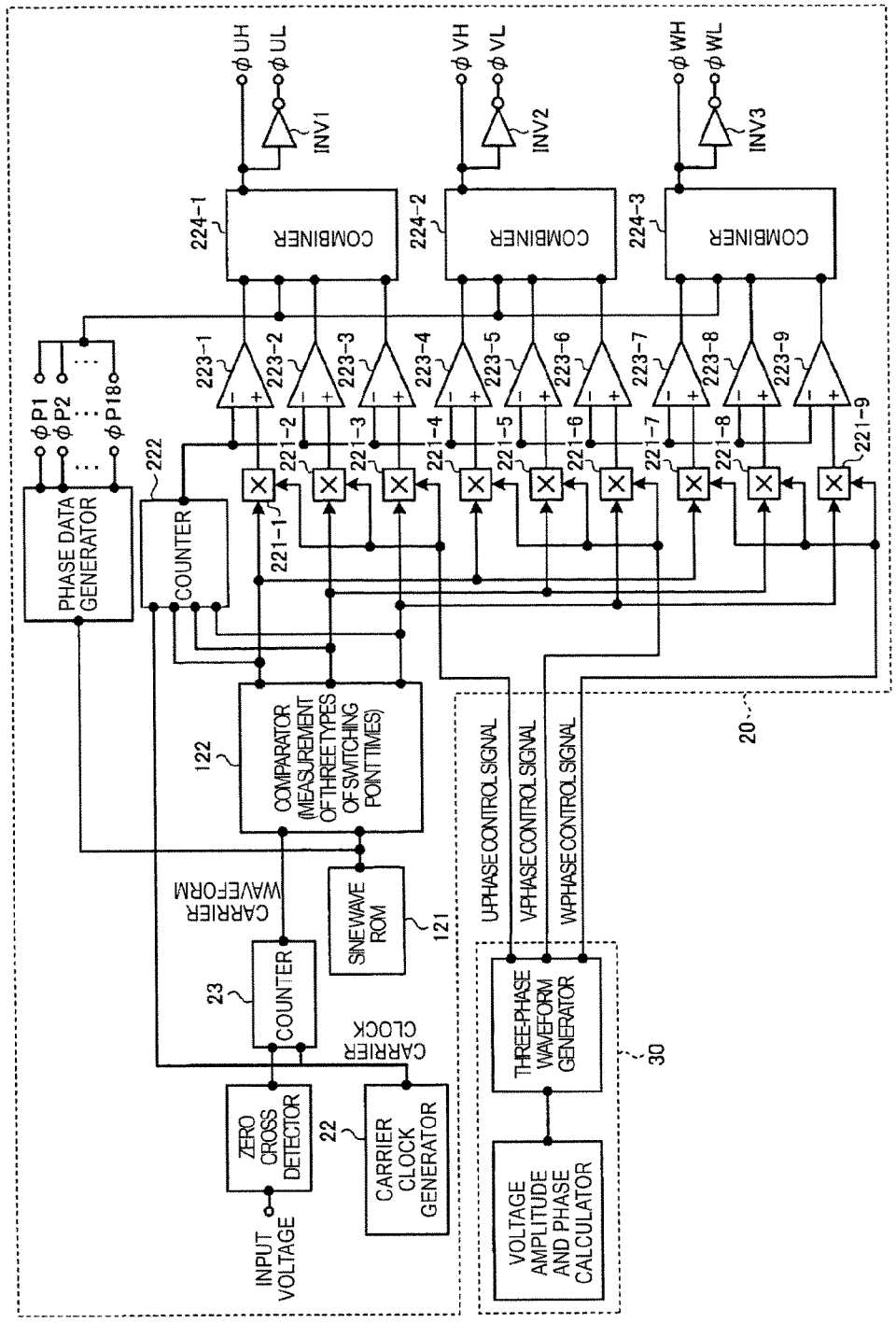
[FIG. 11]

MATRIX CONVERTER

CROSS-REFERENCE TO RELATED APPLICATIONS

This Application is the U.S. National Phase of PCT/JP2014/051290 filed Jan. 22, 2014, which claims priority to Japanese Patent Application No. 2013-010583 filed Jan. 23, 2013. The subject matter of each is incorporated herein by reference in entirety.

TECHNICAL FIELD

The present invention relates to a matrix converter.

BACKGROUND ART

A power converter that converts alternating current (AC) power into AC power without conversion into direct current (DC) power is generally known as a matrix converter. The matrix converter has a configuration in which switch elements for conversion are arranged in one stage. Thus, it is possible to increase efficiency compared with a power converter having a configuration in which a converter and an inverter are combined. Further, since a circuit that handles DC voltage is not provided, a smoothing capacitor is not necessary, to thereby make it possible to increase the life span of a device, and to enhance reliability.

NPL 1 discloses a matrix converter in which a virtual rectifier and a virtual inverter are provided, and respective PWM pulses are subjected to a matrix operation to generate pulses of the matrix converter. Thus, according to the matrix converter disclosed in NPL 1, it is possible to convert an input three-phase AC voltage into a three-phase AC voltage having a voltage and a frequency different from those of the input three-phase AC voltage.

CITATION LIST

Patent Literature

PTL 1: JP-A-2011-30409

Non Patent Literature

NPL 1: J. Itch et al. "A control method for the matrix converter based on virtual AC/DC/AC conversion using carrier comparison method" IEEJ D, 124, 5 (2004-5)

SUMMARY OF INVENTION

Technical Problem

In the conversion technique disclosed in NPL 1, when generating the PWM pulse of the virtual rectifier, it is necessary to perform a process of matrix-converting a voltage vector into a current vector, for example. Accordingly, a complicated process requiring a large computation amount is necessary. That is, in the conversion technique disclosed in NPL 1, a complicated operation such as a matrix operation is essential.

Further, in the conversion technique disclosed in NPL 1, when generating the PWM pulse of the virtual inverter, it is necessary to perform a process of correcting a control signal of the inverter by modulating a triangular wave carrier or by considering DC ripples in order to equivalently distribute a back flow mode of the virtual inverter to the virtual rectifier, for example. Accordingly, a complicated process requiring a considerably large operation amount is necessary.

Further, in the conversion technique disclosed in NPL 1, it is considered that selection of input voltage phases constantly includes two types of selections of maximum-minimum and maximum-intermediate during a carrier period. In the maximum-intermediate phase, a pulse width in the vicinity of a zero cross point of an intermediate voltage phase is narrow. Particularly, the pulse width easily becomes narrow at a low load. Thus, there is a possibility that a time period of the pulse width becomes shorter than a switching time of the switching element. Thus, in the conversion technique disclosed in NPL 1, in input and output current waveforms which represent conversion performance, for example, a distortion factor of waveforms of voltages and currents easily becomes large at the low load. Further, there is a tendency that the power conversion efficiency is lowered.

In order to solve the above problems, an object of the invention is to provide a matrix converter capable of directly converting AC power into AC power by a simple process.

Solution to Problem

According to a first aspect of the invention, there is provided a matrix converter that directly converts input three-phase AC power into three-phase AC power and outputs the converted three-phase AC power to a load, including: a bidirectional switch circuit and a controller. The bidirectional switch circuit switches on or off the supply of the input three-phase AC power to the load. The controller performs different virtual AC/DC conversion processes according to a plurality of modes which are divided depending on magnitude correlation between respective phase voltages in the input three-phase AC power, with respect to the input three-phase AC power. Further, the controller selects two phases from the input three-phase AC power, and generates switching patterns of the bidirectional switch circuit so as to perform different virtual DC/AC conversion processes according to the plurality of modes with respect to line voltages of the two selected phases.

Further, according to a second aspect of the invention, in the matrix converter related to the first aspect of the invention, the controller performs the virtual AC/DC conversion processes with respect to the input three-phase AC power using different first carrier waveform patterns according to the plurality of modes. Further, the controller selects two phases from the input three-phase AC power. Furthermore, the controller generates the switching patterns of the bidirectional switch circuit so as to perform the virtual DC/AC conversion processes with respect to the line voltages of the two selected phases using different second carrier waveform patterns according to the plurality of modes.

According to a third aspect of the invention, in the matrix converter related to the second aspect of the invention, in each of the plurality of modes, the controller, as the virtual AC/DC conversion processes, calculates a plurality of line voltage generating sections from the first carrier waveform patterns and first control signals corresponding to input side phases. Further, the controller, as the virtual DC/AC conversion processes, generates the second carrier waveform patterns corresponding to the plurality of line voltage generating sections. Furthermore, the controller generates the switching patterns of the bidirectional switch circuit from the generated second carrier waveform patterns and second control signals corresponding to output side phases.

Further, according to a fourth aspect of the invention, in the matrix converter related to the third aspect of the invention, the controller recognizes a maximum voltage phase, a minimum voltage phase, and an intermediate voltage phase in the input three-phase AC power. Further, the controller calculates the plurality of line voltage generating sections to be divided into a first section corresponding to the intermediate voltage phase and the minimum voltage phase, a second section corresponding to the maximum voltage phase and the minimum voltage phase, and a third section corresponding to the maximum voltage phase and the intermediate voltage phase.

According to a fifth aspect of the invention, in the matrix converter related to the third or fourth aspect of the invention, the second carrier waveform pattern includes a pattern of which a level varies in a mountain form over two continuous sections among the plurality of line voltage generating sections.

Further, according to a sixth aspect of the invention, in the matrix converter related to the fourth or fifth aspect of the invention, when a voltage phase having a larger voltage value among two voltage phases for each of the plural line voltage generating sections is represented as a positive side phase and a voltage phase having a smaller voltage value among the two voltage phases is represented as a negative side phase, the second carrier waveform pattern includes, when there are phases which are common in the positive side phase and the negative side phase in mode switching, a pattern of which a level is continuous in a mountain form over two modes to be switched, and includes, when there are phases which are reversed in the positive side phase and the negative side phase in the mode switching, a pattern of which a level varies in a saw-tooth form in a boundary between the two modes to be switched.

Advantageous Effects of Invention

According to the invention, switching patterns of a bidirectional switch circuit are generated so as to perform virtual AC/DC conversion processes and virtual DC/AC conversion processes according to magnitude correlation between respective phase voltages of the input three-phase AC power without performing a complicated operation such as a matrix operation. Thus, it is possible to directly convert AC power into AC power by a simple process.

BRIEF DESCRIPTION OF DRAWINGS

FIG. 1 is a diagram illustrating a configuration of a matrix converter according to an exemplary embodiment.

FIGS. 2A-2C are diagrams illustrating configurations of bidirectional switches according to an exemplary embodiment.

FIG. 3 is a diagram illustrating plural modes according to an exemplary embodiment.

FIGS. 4A-4F are diagrams illustrating virtual AC/DC conversion processes according to an exemplary embodiment.

FIGS. 5A-5C are diagrams illustrating a method of selecting voltage phases according to an exemplary embodiment.

FIGS. 6A-6F are diagrams illustrating virtual DC/AC conversion processes according to an exemplary embodiment.

FIGA. 7A-7H are waveform diagrams illustrating an operation of the matrix converter according to an exemplary embodiment.

FIG. 8 is a diagram illustrating a configuration example of a control signal generator and a controller according to an exemplary embodiment.

FIG. 9 is a diagram illustrating a configuration example of a controller according to an exemplary embodiment.

FIG. 10 is a diagram illustrating another configuration example of a control signal generator and a controller according to an exemplary embodiment.

FIG. 11 is a diagram illustrating still another configuration example of a control signal generator and a controller according to an exemplary embodiment.

DESCRIPTION OF EMBODIMENTS

Exemplary embodiments of a matrix converter according to the invention will be described in detail with reference to the accompanying drawings. The invention is not limited to the exemplary embodiments.

Exemplary Embodiment

A matrix converter 1 according to an exemplary embodiment will be described with reference to FIG. 1 and FIGS. 2A-2C. FIG. 1 is a diagram illustrating a configuration of the matrix converter 1. FIGS. 2A-2C are diagrams illustrating configurations of bidirectional switches SRU to STW.

The matrix converter 1 is supplied, as an input, with three-phase alternating current (AC) power from a three-phase AC power supply PS through three-phase power lines Lr, Ls, and Lt. Further, the matrix converter 1 directly converts the input three-phase AC power into three-phase AC power without temporarily converting the three-phase AC power into direct current (DC) power, and outputs the converted three-phase AC power to a load LD through three-phase power lines Lu, Lv, and Lw. The input three-phase AC power and the three-phase AC power are different from each other in voltage and frequency. The input three-phase AC power includes an R-phase AC power, an S-phase AC power, and a T-phase AC power, for example. The three-phase AC power includes a U-phase AC power, a V-phase AC power, and a W-phase AC power, for example.

Specifically, the matrix converter 1 includes a three-phase reactor 40, an input capacitor 50, a bidirectional switch circuit 10, a circuit signal generator 30, and a controller 20.

The three-phase reactor 40 includes plural reactors 41 to 43, for example. The reactor 41 is serially inserted on the R-phase power line Lr, for example. The reactor 42 is serially inserted on the S-phase power line Ls, for example. The reactor 43 is serially inserted on the T-phase power line Lt, for example. The three-phase reactor 40 reduces current ripples and voltage ripples in the three-phase power lines Lr, Ls, and Lt, for example.

The input capacitor 50 includes plural capacitors 51 to 53, for example. The capacitor 51 is connected to the R-phase power line Lr at one end thereof, and is connected to the capacitors 52 and 53 at the other end thereof, for example. The capacitor 52 is connected to the S-phase power line Ls at one end thereof, and is connected to the capacitors 51 and 53 at the other end thereof, for example. The capacitor 53 is connected to the T-phase power line Lt at one end thereof, and is connected to the capacitors 51 and 52 at the other end thereof, for example. The input capacitor 50 reduces current ripples and voltage ripples in the three-phase power lines Lr, Ls, and Lt, for example.

The bidirectional switch circuit 10 switches on or off the supply of the input three-phase AC power to the load to convert the input three-phase AC power into the three-phase AC power. For example, the bidirectional switch circuit 10 includes nine bidirectional switches SRU, SSU, STU, SRV, SSV, STV, SRW, SSW, and STW. As the nine bidirectional switches SRU to STW respectively switch on or off at predetermined timings under the control of the controller 20, the bidirectional switch circuit 10 converts the input three-phase AC power into the three-phase AC power.

The bidirectional switch SRU generates a U-phase AC power component from the R-phase AC power, for example. The bidirectional switch SRU receives a switching signal φSRU from the controller 20, for example. Further, the bidirectional switch SRU switches on or off connection between the R-phase power line Lr and the U-phase power line Lu according to the switching signal φSRU.

The bidirectional switch SSU generates a U-phase AC power component from the S-phase AC power, for example. The bidirectional switch SSU receives a switching signal φSSU from the controller 20, for example. Further, the bidirectional switch SSU switches on or off connection between the S-phase power line Ls and the U-phase power line Lu according to the switching signal φSRU.

The bidirectional switch STU generates a U-phase AC power component from the T-phase AC power, for example. The bidirectional switch STU receives a switching signal φSTU from the controller 20, for example. Further, the bidirectional switch STU switches on or off connection between the T-phase power line Lt and the U-phase power line Lu according to the switching signal φSRU.

The bidirectional switches SRU, SSU, and STU are commonly connected to the U-phase power line Lu. The U-phase AC power components supplied through the bidirectional switches SRU, SSU, and STU are combined on the U-phase power line Lu, to then be supplied to the load LD as the U-phase AC power.

The bidirectional switch SRV generates a V-phase AC power component from the R-phase AC power, for example. The bidirectional switch SRV receives a switching signal φSRV from the controller 20, for example. Further, the bidirectional switch SRV switches on or off connection between the R-phase power line Lr and a V-phase power line Lv according to the switching signal φSRV.

The bidirectional switch SSV generates a V-phase AC power component from the S-phase AC power, for example. The bidirectional switch SSV receives a switching signal φSTV from the controller 20, for example. Further, the bidirectional switch SSV switches on or off connection between the S-phase power line Ls and the V-phase power line Lv according to the switching signal φSRV.

The bidirectional switch STV generates a V-phase AC power component from the T-phase AC power, for example. The bidirectional switch STV receives a switching signal φSTV from the controller 20, for example. Further, the bidirectional switch STV switches on or off connection between the T-phase power line Lt and the V-phase power line Lv according to the switching signal φSRV.

The bidirectional switches SRV, SSV, and STV are commonly connected to the V-phase power line Lv. The V-phase AC power components supplied from the bidirectional switches SRV, SSV, and STV are combined on the V-phase power line Lv, to then be supplied to the load LD as the V-phase AC power.

The bidirectional switch SRW generates a W-phase AC power component from the R-phase AC power, for example. The bidirectional switch SRW receives a switching signal φSRW from the controller 20, for example. Further, the bidirectional switch SRW switches on or off connection between the R-phase power line Lr and the W-phase power line Lw according to the switching signal φSRW.

The bidirectional switch SSW generates a W-phase AC power component from the S-phase AC power, for example. The bidirectional switch SSW receives a switching signal φSSW from the controller 20, for example. Further, the bidirectional switch SSW switches on or off connection between the S-phase power line Ls and the W-phase power line Lw according to the switching signal φSRW.

The bidirectional switch STW generates a W-phase AC power component from the T-phase AC power, for example. The bidirectional switch STW receives a switching signal φSTW from the controller 20, for example. Further, the bidirectional switch STW switches on or off connection between the T-phase power line Lt and the W-phase power line Lw according to the switching signal φSRW.

The bidirectional switches SRW, SSW, and STW are commonly connected to the W-phase power line Lw. The W-phase AC power components supplied from the bidirectional switches SRW, SSW, and STW are combined on the W-phase power line Lw, to then be supplied to the load LD as the W-phase AC power.

Each of the bidirectional switch SRU to STW is equivalent to a switch S shown in FIG. 2A for example. The switch S shown in FIG. 2A receives a switching signal from the controller 20 through a control terminal CT, is switched on to connect a terminal T1 with a terminal T2, or is switched off to disconnect the terminal T1 from the terminal T2. The switch S may cause current to flow in both directions between the terminal T1 and the terminal T2.

The switch S shown in FIG. 2A is an ideal switch. An element that actually forms the switch is configured so that a switching time is present. Thus, the switch S may be configured so that connection is performed as shown in FIGS. 2B or 2C, in consideration of an opening mode and a short-circuit mode during communication, for example. A configuration shown in FIG. 2B is a configuration in which the switch S is realized by serial connection of elements EL1 and EL2 having a reverse blocking function, for example. The elements EL1 and EL2 having the reverse blocking function may be configured by an insulated gate bipolar transistor (IGBT), for example. Terminals T1' and T2' correspond to the terminals T1 and T2 shown in FIG. 2A. Control terminals CT1' and CT1' correspond to the control terminal CT shown in FIG. 2A.

Further, a configuration shown in FIG. 2C is a configuration in which the switch S is realized by serial connection of elements EL11 and EL12 without having the reverse blocking function, for example. The elements EL11 and EL12 without having the reverse blocking function may be configured by an insulated gate bipolar transistor (IGBT) in which a reflux diode is connected to opposite ends thereof, or may be configured by a field effect transistor (FET). A terminal T1" corresponds to the terminal T1 shown in FIG. 2A. A terminal T2" corresponds to the terminal T2 shown in FIG. 2A. Control terminals CT1" and CT2" correspond to the control terminal CT shown in FIG. 2A.

The control signal generator 30 generates control signals (second control signals) CSu, CSv, and CSw depending on arbitrary three-phase AC power to be output to a load side, and supplies the generated control signals CSu, CSv, and CSw to the controller 20. The control signals CSu, CSv, and CSw are sine waves in the present exemplary embodiment. The control signal CSu has an AC waveform (for example, sine wave in the present exemplary embodiment) depending on the U-phase AC voltage to be supplied to the load LD. The control signal CSv has an AC waveform (for example, sine wave in the present exemplary embodiment) depending on the V-phase AC voltage to be supplied to the load LD. The control signal CSw has an AC waveform (for example, sine wave in the present exemplary embodiment) depending on the W-phase AC voltage to be supplied to the load LD.

The controller 20 generates a switching pattern of each of the bidirectional switches SRU to STW in the bidirectional switch circuit 10. For example, the controller 20 performs a virtual AC/DC conversion process with respect to the input three-phase AC power supplied to the bidirectional switch circuit 10. Further, the controller 20 generates a switching pattern (that is, a switching signal pattern) of the bidirectional switch circuit 10 to perform a virtual DC/AC conversion process with respect to power subjected to the virtual AC/DC conversion process. Hereinafter, it is assumed that the "perform virtual AC/DC conversion process" means that the virtual AC/DC conversion process is virtually performed, and the "perform the virtual DC/AC conversion process" means that the virtual DC/AC conversion process is virtually performed.

Here, the controller 20 generates the switching patterns of the bidirectional switch circuit 10 to perform different virtual AC/DC conversion processes with respect to plural modes (for example, modes I to VI shown in FIG. 3) divided depending on magnitude correlation between respective phase voltages in the input three-phase AC power, with respect to the input three-phase AC power.

Specifically, the controller 20 detects an input AC voltage (for example, R-phase AC voltage), and detects a zero cross point of the input AC voltage from the detected input AC voltage. The controller 20 estimates AC voltages of the respective phases (R-phase, S-phase, and T-phase) on the input side as a first control signal based on the detected zero cross point (for example, by estimating the phase of each phase on the input side using the detected zero cross point as a reference). Further, the controller 20 recognizes which mode among the plural modes a current mode is according to the magnitude correlation between the estimated AC voltages of the respective phases.

Here, the controller 20 controls the bidirectional switch circuit 10 to perform the virtual AC/DC conversion processes with respect to the input three-phase AC power using different first carrier waveform patterns (for example, first carrier waveform patterns CW11 to CW13 shown in FIGS. 4A-4F) with respect to the plural modes. That is, the controller 20 determines the first carrier waveform patterns to be used in the virtual AC/DC conversion processes according to the recognized modes. Further, the controller 20 compares the determined first carrier waveform patterns with the first control signals corresponding to the input side phases. The controller 20 generates plural virtual switching signals (R-phase pulse, S-phase pulse, and T-phase pulse) such that the respective bidirectional switches SRU to STW virtually generate direct current (DC) powers according to the comparison results. Further, the controller 20 calculates plural line voltage generating sections (for example, sections TS11, TS12, and TS13 shown in FIG. 4A) based on a combination of levels (High and Low) of the plural virtual switching signals (R-phase pulse, S-phase pulse, and T-phase pulse). In other words, the controller 20 controls the respective bidirectional switches SRU to SRW to perform the virtual switching operation to generate DC power. Thus, the controller 20 causes the respective bidirectional switches SRU to STW to virtually perform the AC/DC conversion processes (virtual AC/DC conversion processes).

The virtual switching operation refers to a switching operation that is actually different from a switching operation performed by each of the bidirectional switches SRU to STW. The virtual switching operation is a switching operation which is considered to be virtually performed by each of the bidirectional switches SRU to STW since it is considered that virtual DC power is generated in an intermediate stage between the virtual AC/DC conversion process and the virtual DC/AC conversion process. The process of generating the virtual DC power in the intermediate stage is a virtual process in all respects, and thus, the process is not actually performed.

Further, the controller 20 controls the switching patterns (that is, the switching signal patterns) of the bidirectional switch circuit 10 so as to perform the different virtual DC/AC conversion processes according to the plural modes (for example, modes I to VI shown in FIG. 3), with respect to the power subjected to the virtual AC/DC conversion processes.

Specifically, the controller 20 controls the bidirectional switch circuit 10 to perform the virtual DC/AC conversion processes using different second carrier waveform patterns (for example, second carrier waveform patterns CW21 to CW26 shown in FIGS. 6A-6F) according to the plural modes. That is, the controller 20 generates the second carrier waveform patterns corresponding to plural line voltage generating sections used in the virtual DC/AC conversion processes according to the recognized modes. Here, the plural line voltage generating sections are based on a combination of levels of plural virtual switching signals. That is, the controller 20 generates the second carrier waveform patterns according to the recognized modes and the combination of the levels of the plural switching signals by which the respective bidirectional switches SRU to STW virtually generate the DC power.

Further, the controller 20 receives the control signals CSu, CSv, and CSw as the second control signals (for example, having sizes which are changed according to amplitudes of sine waves depending on voltage waveforms of the U-phase, V-phase, and W-phase) corresponding to the output side phases from the control signal generator 30. The controller 20 compares the generated second carrier waveform patterns with the second control signals CSu, CSv, and CSw corresponding to the output side phases to generate the switching signals φSRU to φSTW of the respective bidirectional switches SRU to STW in the bidirectional switch circuit 10. Here, each of the second control signals CSu, CSv, and CSw corresponds to a three-phase AC waveform depending on the AC power to be supplied to the load LD. Thus, it is possible to perform the control so that the three-phase AC power depending on the respective second control signals CSu, CSv, and CSw is output from the bidirectional switch circuit 10 to the load LD. In other words, the controller 20 causes the respective bidirectional switches SRU to STW to virtually perform the DC/AC conversion processes (virtual DC/AC conversion processes).

Next, the plural modes recognized by the controller 20 will be described with reference to FIG. 3. FIG. 3 is a diagram illustrating the plural modes I to VI.

The controller 20 recognizes six modes I to VI as shown in FIG. 3, for example, according to magnitude correlation between estimated AC voltages of the respective phases (R-phase, S-phase, and T-phase).

In the mode I, the R-phase is a maximum voltage phase, the T-phase is a minimum voltage phase, and the S-phase is an intermediate voltage phase. For example, when it is recognized that the R-phase is the maximum voltage phase, the T-phase is the minimum voltage phase, and the S-phase is the intermediate voltage phase, the controller 20 recognizes that a current mode is the mode I.

In the mode II, the S-phase is a maximum voltage phase, the T-phase is a minimum voltage phase, and the R-phase is an intermediate voltage phase. For example, when it is recognized that the S-phase is the maximum voltage phase, the T-phase is the minimum voltage phase, and the R-phase is the intermediate voltage phase, the controller 20 recognizes that a current mode is the mode II.

In the mode III, the S-phase is a maximum voltage phase, the R-phase is a minimum voltage phase, and the T-phase is an intermediate voltage phase. For example, when it is recognized that the S-phase is the maximum voltage phase, the R-phase is the minimum voltage phase, and the T-phase is the intermediate voltage phase, the controller 20 recognizes that a current mode is the mode III.

In the mode IV, the T-phase is a maximum voltage phase, the R-phase is a minimum voltage phase, and the S-phase is an intermediate voltage phase. For example, when it is recognized that the T-phase is the maximum voltage phase, the R-phase is the minimum voltage phase, and the S-phase is the intermediate voltage phase, the controller 20 recognizes that a current mode is the mode IV.

In the mode V, the T-phase is a maximum voltage phase, the S-phase is a minimum voltage phase, and the R-phase is an intermediate voltage phase. For example, when it is recognized that the T-phase is the maximum voltage phase, the S-phase is the minimum voltage phase, and the R-phase is the intermediate voltage phase, the controller 20 recognizes that a current mode is the mode V.

In the mode VI, the R-phase is a maximum voltage phase, the S-phase is a minimum voltage phase, and the T-phase is an intermediate voltage phase. For example, when it is recognized that the R-phase is the maximum voltage phase, the S-phase is the minimum voltage phase, and the T-phase is the intermediate voltage phase, the controller 20 recognizes that a current mode is the mode VI.

Next, the virtual AC/DC conversion process (virtual AC/DC conversion process) in each of the plural modes I to VI will be described with reference to FIG. 4A-4F. FIGS. 4A-4F show virtual AC/DC conversion processes in the plural modes I to VI. Hereinafter, for ease of description, a case where a DC voltage setting gain determined according to a DC voltage setting value (virtual DC voltage which is a conversion target) is 1 will be described as an example.

In the mode I, as shown in FIG. 4A, the controller 20 determines a first carrier waveform pattern CW11 including a falling saw-tooth wave 1 and a rising saw-tooth wave 2 as the first carrier waveform pattern to be used in the virtual AC/DC conversion process. Hereinafter, the "falling saw-tooth wave" represents a saw-tooth wave having a negative slope of which amplitude linearly decreases with the lapse of time, and the "rising saw-tooth wave" represents a saw-tooth wave having a positive slope of which amplitude linearly increases with the lapse of time.

Further, the controller 20 estimates an R-phase voltage a, an S-phase voltage b, and a T-phase voltage c according to zero cross points detected as described above, for example. The controller 20 estimates phases of the R-phase, the S-phase, and the T-phase at a certain timing with reference to the detected zero cross points. Further, the controller 20 estimates the R-phase voltage a, the S-phase voltage b, and the T-phase voltage c according to the estimated phases of the R-phase, the S-phase, and the T-phase. The R-phase voltage a, the S-phase voltage b, the T-phase voltage c are obtained by normalizing the phase voltages between "−1" and "1". Here, DC voltages of sections (line voltage generating sections) TS11, TS12, and TS13 shown in FIG. 4A correspond to an ST voltage (=b−c), an RT voltage (=a−c), and an RS voltage (=a−b), respectively.

Pulses of the respective phases in the mode I will be described. In the mode I, it is assumed that the R-phase is the maximum voltage phase, the T-phase is the minimum voltage phase, and the S-phase is the intermediate voltage phase. In the maximum voltage phase and the minimum voltage phase, pulses are switched on for times proportional to potentials thereof. Accordingly, an R-phase pulse width becomes $x=T|a|$, and a T-phase pulse width becomes $z=T|c|$. Here, a timing when the R-phase pulse is switched on (a timing when the section TS11 ends) is obtained from an intersection between the R-phase voltage $|a|$ and the saw-tooth wave 1. Thus, the R-phase pulse is obtained. A timing when the T-phase pulse is switched off (a timing when the section TS11 and the section TS12 end) is obtained from an intersection between the T-phase voltage $|c|$ and the saw-tooth wave 2. Thus, the T-phase pulse is obtained. The intermediate phase pulse is switched on when any pulse of the maximum voltage phase and the minimum voltage phase is switched off. Accordingly, the S-phase pulse is obtained from the intersection between the R-phase voltage $|a|$ and the saw-tooth wave 1 and the intersection between the T-phase voltage $|c|$ and the saw-tooth wave 2.

Further, the widths of the sections TS11, TS12, and TS13 are $T \times (1-|a|)$, $T \times (|a|+|c|)-1)$, $T \times (1-|c|)$, respectively. That is, virtual plural switching signals (R-phase pulse, S-phase pulse, and T-phase pulse) having the widths corresponding to the sections TS11, TS12, and TS13 for generating virtual DC voltages are generated by the virtual AC/DC conversion process, respectively. An average of the DC voltages in the switching cycle T is calculated by integrating the DC voltages for each section and adding the integrated DC voltages, and then, by dividing the result by the switching cycle T, which may be expressed as follows.

$$\text{Average of DC voltages in switching cycle } T = \{(b-c) \times T \times (1-a) + (a-c) \times T \times (a-c-1) + (a-b) \times T \times (1+c)\} / T = a^2 + c^2 - b(a+c) \quad \text{Expression 1}$$

Here, Expression 1 may be expressed as Expression 2, in consideration of a+b+c=0 (three-phase condition).

$$\text{Average of DC voltages in switching cycle } T = a^2 + b^2 + c^2 \quad \text{Expression 2}$$

Further, Expression 2 may be expressed as Expression 3 from $a^2+b^2+c^2=3/2$ in an AC theory.

$$\text{Average of DC voltages in switching cycle } T = 3/2 \quad \text{Expression 3}$$

As shown in Expression 3, the average of the virtual DC voltages in the switching cycle T may be defined as a constant voltage.

Input currents in the mode I will be described. As an R-phase input current, a positive current proportional to the time of the R-phase voltage a flows. As a T-phase input current, a negative current proportional to the magnitude $|c|$ of the T-phase voltage flows. As an S-phase input current, a positive current flows at the section TS11, and a negative current flows at the section TS13. Accordingly, the flowing current becomes $T \times (1-a) - T \times (1+c) - T(-a-c) = Tb$, and the S-phase voltage b is obtained by dividing the flowing current by the switching cycle T. Accordingly, currents which are respectively proportional to the R-phase voltage a, the S-phase voltage b and the T-phase voltage c flow in the R-phase, the S-phase, and the T-phase. Thus, the respective phase components of the input AC currents may be expressed as sine waves.

In the mode II, as shown in FIG. 4B, the controller 20 determines a first carrier waveform pattern CW12 including arising saw-tooth wave 2 as the first carrier waveform pattern to be used in the virtual AC/DC conversion process. Further, the controller 20 estimates an R-phase voltage a, an S-phase voltage b, and a T-phase voltage c according to zero cross points detected as described above, for example. The R-phase voltage a, the S-phase voltage b, the T-phase voltage c are obtained by normalizing the phase voltages between "−1" and "1". Here, DC voltages of sections (line voltage generating sections) TS21, TS22, and TS23 shown in FIG. 4B correspond to an ST voltage (=b−c), an RT voltage (=a−c), and an RS voltage (=b−a), respectively.

Pulses of the respective phases in the mode II will be described. In the mode II, it is assumed that the S-phase is the maximum voltage phase, the T-phase is the minimum voltage phase, and the R-phase is the intermediate voltage phase. In the mode II, the pulses of the R, S, and T phases are switched on for times proportional to potentials thereof in the maximum voltage phase and the minimum voltage phase without changing the switch on and switch off order. Thus, in the mode II, switch on and switch off timings of the respective phase pulses shown in FIG. 4B are obtained using modulation waveforms 3 and 2B, and the saw-tooth wave 2.

Further, the widths of the sections TS21, TS22, and TS23 are $T \times (|b|+|c|-1)$, $T \times (1-|b|)$, and $T \times (1-|c|)$, respectively. That is, plural virtual switching signals (R-phase pulse, S-phase pulse, and T-phase pulse) having the widths corresponding to the sections TS21, TS22, and TS23 for generating virtual DC voltages are generated by the virtual AC/DC conversion process, respectively. An average of the DC voltages in the switching cycle T may be expressed as follows.

Average of DC voltages in switching cycle $T=\{(b-c) \times T \times (-c+b-1)+(a-c) \times T \times (-b+1)+(b-a) \times T \times (1+c)\}/T=b^2+c^2-a(b+c)$   Expression 4

Here, Expression 4 may be expressed as Expression 5, in consideration of a+b+c=0 (three-phase condition).

Average of DC voltages in switching cycle $T=a^2+b^2+c^2$   Expression 5

Further, Expression 5 may be expressed as Expression 6 from $a^2+b^2+c^2=3/2$ in the AC theory.

Average of DC voltages in switching cycle $T=3/2$   Expression 6

As shown in Expression 6, the average of the virtual DC voltages in the switching cycle T may be defined as a constant voltage.

Input currents in the mode II will be described. In the mode II, since the S-phase is the maximum voltage phase and the T-phase is the minimum voltage phase, in the S-phase, a positive current proportional to the time of the S-phase voltage b flows, and in the T-phase, a negative current proportional to the time of the T-phase voltage c flows. In the R-phase, a negative current flows at the section TS22, and a positive current flows at the section TS23. Accordingly, the flowing current becomes $T \times (1-a)-T \times (1+c)=Ta$, and the R-phase voltage a is obtained by dividing the flowing current by the switching cycle T. Accordingly, currents proportional to the voltages flow in the respective phases, and thus, the respective phases of the input AC currents may be expressed as sine waves.

In the mode III, as shown in FIG. 4C, the controller 20 determines a first carrier waveform pattern CW13 including a falling saw-tooth wave 1 as the first carrier waveform pattern to be used in the virtual AC/DC conversion process. Further, the controller 20 estimates an R-phase voltage a, an S-phase voltage b, and a T-phase voltage c according to zero cross points detected as described above, for example. The R-phase voltage a, the S-phase voltage b, the T-phase voltage c are obtained by normalizing the phase voltages between "−1" and "1". Here, DC voltages of sections (line voltage generating sections) sections TS31, TS32, and TS33 shown in FIG. 4C correspond to an ST voltage (=c−b), an RT voltage (=a−c), and an RS voltage (=a−b), respectively.

Pulses of the respective phases in the mode III will be described. In the mode III, it is assumed that the S-phase is the maximum voltage phase, the R-phase is the minimum voltage phase, and the T-phase is the intermediate voltage phase. In the mode III, the pulses of the R, S, and T phases are switched on for times proportional to potentials thereof in the maximum voltage phase and the minimum voltage phase without changing the switch on and switch off order. Thus, in the mode III, switch on and switch off timings of the respective pulses shown in FIG. 4C are obtained using modulation waveforms 1 and 2A, and the saw-shaped wave 1.

Further, the widths of the sections TS31, TS32, and TS33 are $T \times (1-|a|)$, $T \times (1-|b|)$, and $T \times (|a|-|b|-1)$, respectively. That is, plural virtual switching signals (R-phase pulse, S-phase pulse, and T-phase pulse) having the widths corresponding to the sections TS31, TS32, and TS33 for generating virtual DC voltages are generated by the virtual AC/DC conversion process, respectively. An average of the DC voltages in the switching cycle T may be expressed as follows.

Average of DC voltages in switching cycle $T=\{(c-b) \times T \times (1-a)+(a-c) \times T \times (b+1)+(a-b) \times T \times (a-b-1)\}/T=a^2+b^2-c(a+b)$   Expression 7

Here, Expression 7 may be expressed as Expression 8, in consideration of a+b+c=0 (three-phase condition).

Average of DC voltages in switching cycle $T=a^2+b^2+c^2$   Expression 8

Further, Expression 8 may be expressed as Expression 9 from $a^2+b^2+c^2=3/2$ in the AC theory.

Average of DC voltages in switching cycle $T=3/2$   Expression 9

As shown in Expression 9, the average of the virtual DC voltages in the switching cycle T may be defined as a constant voltage.

Input currents in the mode III will be described. In the S-phase which is the maximum voltage phase, a positive current proportional to the time of the S-phase voltage b flows, and in the R-phase which is the minimum voltage phase, a negative current proportional to the time of the R-phase voltage a flows. In the T-phase, a negative current flows at the section TS31, and a positive current flows at the section TS32. Accordingly, the flowing current becomes $T \times (1-a)-T \times (1+b)=Tc$, and the T-phase voltage c is obtained by dividing the flowing current by the switching cycle T. Accordingly, currents proportional to the voltages flow in the respective phases, and thus, the respective phases of the input AC currents may be expressed as sine waves.

As shown in FIG. 4D, the virtual AC/DC conversion process in the mode IV is the same as the virtual AC/DC conversion process in the mode I (see FIG. 4A). Sections (line voltage generating sections) TS41, TS42, and TS43 are calculated in a similar way to the mode I.

As shown in FIG. 4E, the virtual AC/DC conversion process in the mode V is the same as the virtual AC/DC conversion process in the mode II (see FIG. 4B). Sections (line voltage generating sections) TS51, TS52, and TS53 are calculated in a similar way to the mode II.

As shown in FIG. 4F, the virtual AC/DC conversion process in the mode VI is the same as the virtual AC/DC conversion process in the mode III (see FIG. 4C). Sections (line voltage generating sections) TS61, TS62, and TS63 are calculated in a similar way to the mode III.

Next, the virtual DC/AC conversion process in each of the plural modes I to VI will be described with respect to FIGS. 5A-5C. FIGS. 5A-5C are diagrams illustrating a method of selecting voltage phases in the virtual DC/AC conversion process. FIGS. 6A-6F illustrate the virtual DC/AC conversion processes in the plural modes I to VI, respectively. Respective sections TS11 to TS63 in FIGS. 6A-6F correspond to the respective sections TS11 to TS63 in FIGS. 4A-4F (that is, the lengths of the sections are the same). However, for ease of illustration, the lengths of the respective sections are shown differently than the lengths in FIGS. 4A-4F. Hereinafter, a case where the second control signal is the U-phase control signal CSu will be described as an example. This description is similarly applied to a case where the second control signal is the V-phase control signal CSv or the W-phase control signal CSw.

First, the method of selecting the voltage phases will be described. For example, as shown in FIGS. 5A-5C, a case where "DC voltage in switching cycle T is P-phase voltage– N-phase voltage" is considered. Here, when a voltage phase having a higher level among two voltage phases in line voltages is a positive side phase and a voltage phase having a lower level is a negative side phase, the P-phase is the positive side phase and the N-phase is the negative side phase.

For example, as shown in FIG. 5A, when a carrier waveform pattern in the switching cycle T is a downward-mountain shaped carrier waveform pattern CW1, the controller 20 compares the carrier waveform pattern CW1 with the U-phase control signal CSu. When the U-phase control signal CSu is disposed on an upper side with reference to the carrier waveform pattern CW1 (for example, in the case of a section TS2 shown in FIG. 5A), the controller 20 selects the positive side phase, that is, the P-phase. Thus, the controller 20 sets a P-phase selecting signal to a switch on level, and sets an N-phase selecting signal to a switch off level. Further, when the U-phase control signal CSu is disposed on a lower side with reference to the carrier waveform pattern CW1 (for example, in the case of sections TS1 and TS3 shown in FIG. 5A), the controller 20 selects the negative side phase, that is, the N-phase. Then, the controller 20 sets the N-phase selecting signal to a switch on level, and sets the P-phase selecting signal to a switch off level.

Alternatively, for example, as shown in FIG. 5B, when the carrier waveform pattern in the switching cycle T is a falling saw-tooth shaped carrier waveform pattern CW2, the controller 20 compares the carrier waveform pattern CW2 with the U-phase control signal CSu. When the U-phase control signal CSu is disposed on an upper side with reference to the carrier waveform pattern CW2 (for example, in the case of a section TS5 shown in FIG. 5B), the controller 20 selects the positive side phase, that is, the P-phase. Thus, the controller 20 sets a P-phase selecting signal to a switch on level, and sets an N-phase selecting signal to a switch off level. When the U-phase control signal CSu is disposed on a lower side with reference to the carrier waveform pattern CW2 (for example, in the case of a section TS4 shown in FIG. 5B), the controller 20 selects the negative side phase, that is, the N-phase. Then, the controller 20 sets the N-phase selecting signal to a switch on level, and sets the P-phase selecting signal to a switch off level.

Alternatively for example, as shown in FIG. 5C, when the carrier waveform pattern in the switching cycle T is a rising saw-tooth shaped carrier waveform pattern CW3, the controller 20 compares the carrier waveform pattern CW3 with the U-phase control signal CSu. When the U-phase control signal CSu is disposed on an upper side with reference to the carrier waveform pattern CW3 (for example, in the case of a section TS6 shown in FIG. 5C), the controller 20 selects the positive side phase, that is, the P-phase. Thus, the controller 20 sets the P-phase selecting signal to a switch on level, and sets the N-phase selecting signal to a switch off level. When the U-phase control signal CSu is disposed on a lower side with reference to the carrier waveform pattern CW3 (for example, in the case of a section TS7 shown in FIG. 5C), the controller 20 selects the negative side phase, that is, the N-phase. Further, the controller 20 sets the N-phase selecting signal to a switch on level, and sets the P-phase selecting signal to a switch off level.

Next, the respective modes I to VI will be described. As described later, the second carrier waveform pattern is determined to have a pattern of which a level varies in a mountain form over two continuous sections among the plural line voltage generating sections. Further, when a voltage phase having a larger voltage value among two voltage phases in each of the plural line voltage generating sections is represented as the positive side phase, and a voltage phase having a smaller voltage value is represented as the negative side phase, the second carrier waveform pattern is determined to have a pattern of which a level is continuous in a mountain form over two modes to be switched, when there are phases which are common in the positive side phase and the negative side phase in mode switching, and is determined to have a pattern of which a level varies in a saw-tooth form in a boundary between the two modes to be switched, when there are phases which are reversed in the positive side phase and the negative side phase in the mode switching.

As shown in FIG. 6A, in the mode I, the controller 20 determines a second carrier waveform pattern CW21 including a rising saw-tooth wave, a falling saw-tooth wave, and a rising saw-tooth wave in the order of the sections TS11, TS12, and TS13 as the second carrier waveform pattern to be used in the virtual DC/AC conversion process. Further, the controller 20 receives the U-phase control signal CSu from the control signal generator 30, for example. The sections TS11, TS12, and TS13 shown in FIG. 6A correspond to the sections TS11, TS12, and TS13 shown in FIG. 4A (that is, the lengths of the sections are the same). However, for ease of illustration, the lengths of the respective sections are shown differently than the lengths in FIG. 4A.

Here, DC voltages of the sections (line voltage generating sections) TS11, TS12, and TS13 in the virtual AC/DC conversion process correspond to an ST voltage (=b−c), an RT voltage (=a−c), and an RS voltage (=a−b), respectively. When a voltage phase having a higher level among two voltage phases in line voltages is a positive side phase and a voltage phase having a lower level is a negative side phase, in the sections (line voltage generating sections) TS11, TS12, and TS13, the S-phase, R-phase and R-phase are the positive side phases, and the T-phase, T-phase, and S-phase are the negative side phases, respectively.

The controller 20 compares the second carrier waveform pattern CW21 with the U-phase control signal CSu. In the section (line voltage generating section) TS11, when the U-phase control signal CSu is disposed on an upper side with reference to the second carrier waveform pattern CW21

(for example, in the case of the first half of the section TS11), the controller 20 selects the positive side phase, that is, the S-phase. Thus, the controller 20 sets the switching signal φSSU which is an S-phase selecting signal to a switch on level, and sets the other switching signals φSRU and φSTU to a switch off level. When the U-phase control signal CSu is disposed on a lower side with reference to the second carrier waveform pattern CW21 (for example, in the case of the second half of the section TS11), the controller 20 selects the negative side phase, that is, the T-phase. Thus, the controller 20 sets the switching signal φSTU which is a T-phase selecting signal to a switch on level, and sets the other switching signals φSRU and φSSU to a switch off level.

In the section (line voltage generating section) TS12, when the U-phase control signal CSu is disposed on a lower side with reference to the second carrier waveform pattern CW21 (for example, in the case of the first half of the section TS12), the controller 20 selects the negative side phase, that is, the T-phase. Thus, the controller 20 sets the switching signal φSTU which is the T-phase selecting signal to a switch on level, and sets the other switching signals φSRU and φSSU to a switch off level. When the U-phase control signal CSu is disposed on an upper side with reference to the second carrier waveform pattern CW21 (for example, in the case of the second half of the section TS12), the controller 20 selects the positive side phase, that is, the R-phase. Thus, the controller 20 sets the switching signal φSRU which is an R-phase selecting signal to a switch on level, and sets the other switching signals φSSU and φSTU to a switch off level.

In the section (line voltage generating section) TS13, when the U-phase control signal CSu is disposed on an upper side with reference to the second carrier waveform pattern CW21 (for example, in the case of the first half of the section TS13), the controller 20 selects the positive side phase, that is, the R-phase. Thus, the controller 20 sets the switching signal φSRU which is the R-phase selecting signal to a switch on level, and sets the other switching signals φSSU and φSTU to a switch off level. When the U-phase control signal CSu is disposed on a lower side with reference to the second carrier waveform pattern CW21 (for example, in the case of the second half of the section TS13), the controller 20 selects the negative side phase, that is, the S-phase. Thus, the controller 20 sets the switching signal φSSU which is the S-phase selecting signal to a switch on level, and sets the other switching signals φSRU and φSTU to a switch off level.

The selecting signals, that is, the switching signals of the respective phases in the mode I will be described. A pulse width of the switching signal φSRU which is the R-phase selecting signal is defined as hx obtained by reducing a pulse width x (see FIG. 4A) of the R-phase pulse in proportion to a signal level h of the U-phase control signal (that is, a signal of which the magnitude varies corresponding to the amplitude of the U-phase voltage) CSu. A pulse width of the switching signal φSSU which is the S-phase selecting signal is defined as by obtained by reducing a pulse width y (see FIG. 4A) of the S-phase pulse in proportion to the signal level h of the U-phase control signal CSu. A pulse width of the switching signal φSTU which is the T-phase selecting signal is defined as hz obtained by reducing a pulse width z (see FIG. 4A) of the T-phase pulse in proportion to the signal level h of the U-phase control signal CSu.

Further, since the respective switching signals φSRU, φSSU, and φSTU are alternatively switched on, the R-phase voltage a, the S-phase voltage b, and the T-phase voltage c are generated, respectively, during periods of the pulse widths of the respective switching signals φSRU, φSSU, and φSTU. An average of the DC voltages in the switching cycle T is calculated by integrating the voltages for each period and adding up the integrated voltages, and then, by dividing the result by the switching cycle T, which may be expressed as follows.

Average of output voltages in switching cycle $T = \{a(hx) + b(hy) + c(hz)\}/T = h(ax + by + cz)/T$     Expression 10

Since the R-phase pulse width x is T|a|, the S-phase pulse width y is T|b|, and the T-phase pulse width z is T|c|, Expression 10 may be expressed as Expression 11.

Average of output voltages in switching cycle $T = h(a^2+b^2+c^2)$     Expression 11

Further, Expression 11 may be expressed as Expression 12 from $a^2+b^2+c^2=3/2$ in the AC theory.

Average of output voltages in switching cycle $T = h \times 3/2$     Expression 12

As shown in Expression 12, the average of the output voltages in the switching cycle T may be set to be proportional to the signal level h of the U-phase control signal CSu. That is, the U-phase control signal CSu has an AC waveform (for example, sine wave in the present exemplary embodiment) according to the U-phase AC voltage to be supplied to the load LD. Accordingly, by generating a switching pattern of the bidirectional switch circuit 10 by modulating the AC waveform (for example, sine wave) with a predetermined carrier waveform pattern, it is possible to perform a control so that an AC voltage depending on the U-phase control signal CSu (of sine wave, for example) is output to the load LD from the bidirectional switch circuit 10.

As shown in FIG. 6B, in the mode II, the controller 20 determines a second carrier waveform pattern CW22 including a rising saw-tooth wave, a falling saw-tooth wave, and a falling saw-tooth wave in the order of the sections TS21, TS22, and TS23 as the second carrier waveform pattern to be used in the virtual DC/AC conversion process. Further, the controller 20 receives the U-phase control signal CSu from the control signal generator 30, for example. The sections TS21, TS22, and TS23 shown in FIG. 6B correspond to the sections TS21, TS22, TS23 shown in FIG. 4B (that is, the lengths of the sections are the same). However, for ease of illustration, the lengths of the respective sections are shown differently than the lengths in FIG. 4B.

Here, DC voltages of the sections (line voltage generating sections) TS21, TS22, and TS23 in the virtual AC/DC conversion process correspond to an ST voltage (=b−c), an RT voltage (=a−c), and an SR voltage (=b−a), respectively. When a voltage phase having a higher level among two voltage phases in line voltages is a positive side phase and a voltage phase having a lower level is a negative side phase, in the sections (line voltage generating sections) TS21, TS22, and TS23, the S-phase, R-phase and S-phase are the positive side phases, and the T-phase, T-phase, and R-phase are the negative side phases, respectively.

The controller 20 compares the second carrier waveform pattern CW22 with the U-phase control signal CSu. In the section (line voltage generating section) TS21, when the U-phase control signal CSu is disposed on an upper side with reference to the second carrier waveform pattern CW22 (for example, in the case of the first half of the section TS21), the controller 20 selects the positive side phase, that is, the S-phase. Thus, the controller 20 sets the switching signal φSSU which is the S-phase selecting signal to a switch on level, and sets the other switching signals φSRU and φSTU to a switch off level. When the U-phase control signal CSu is disposed on a lower side with reference to the second carrier waveform pattern CW22 (for example, in the case of the second half of the section TS21), the controller 20 selects the negative side phase, that is, the T-phase. Thus, the controller 20 sets the switching signal φSTU which is the T-phase selecting signal to a switch on level, and sets the other switching signals φSRU and φSSU to a switch off level.

In the section (line voltage generating section) TS22, when the U-phase control signal CSu is disposed on a lower side with reference to the second carrier waveform pattern CW22 (for example, in the case of the first half of the section TS22), the controller 20 selects the negative side phase, that is, the T-phase. Thus, the controller 20 sets the switching signal φSTU which is the T-phase selecting signal to a switch on level, and sets the other switching signals φSRU and φSSU to a switch off level. When the U-phase control signal CSu is disposed on an upper side with reference to the second carrier waveform pattern CW22 (for example, in the case of the second half of the section TS22), the controller 20 selects the positive side phase, that is, the R-phase. Thus, the controller 20 sets the switching signal φSRU which is an R-phase selecting signal to a switch on level, and sets the other switching signals φSSU and φSTU to a switch off level.

In the section (line voltage generating section) TS23, when the U-phase control signal CSu is disposed on a lower side with reference to the second carrier waveform pattern CW22 (for example, in the case of the first half of the section TS23), the controller 20 selects the negative side phase, that is, the R-phase. Thus, the controller 20 sets the switching signal φSRU which is an R-phase selecting signal to a switch on level, and sets the other switching signals φSSU and φSTU to a switch off level. When the U-phase control signal CSu is disposed on an upper side with reference to the second carrier waveform pattern CW22 (for example, in the case of the second half of the section TS23), the controller 20 selects the positive side phase, that is, the S-phase, and sets the switching signal φSSU which is the S-phase selecting signal to a switch on level. Also, the controller 20 sets the other switching signals φSRU and φSTU to a switch off level.

The selecting signals, that is, the switching signals of the respective phases in the mode II will be described. A pulse width of the switching signal φSRU which is the R-phase selecting signal is defined as hx obtained by reducing a pulse width x (see FIG. 4B) of the R-phase pulse in proportion to a signal level h of the U-phase control signal (that is, a signal of which the magnitude varies corresponding to the amplitude of the U-phase voltage) CSu. A pulse width of the switching signal φSSU which is the S-phase selecting signal is defined as by obtained by reducing a pulse width y (see FIG. 4B) of the S-phase pulse in proportion to the signal level h of the U-phase control signal CSu. A pulse width of the switching signal φSTU which is the T-phase selecting signal is defined as hz obtained by reducing a pulse width z (see FIG. 4B) of the T-phase pulse in proportion to the signal level h of the U-phase control signal CSu.

Further, since the respective switching signals φSRU, φSSU, and φSTU are alternatively switched on, the R-phase voltage a, the S-phase voltage b, and the T-phase voltage c are generated, respectively, during periods of the pulse widths of the respective switching signals φSRU, φSSU, and φSTU. An average of the DC voltages in the switching cycle T is calculated by integrating the voltages for each period and adding up the integrated voltages, and then, by dividing the result by the switching cycle T, which may be expressed as follows.

$$\text{Average of output voltages in switching cycle } T = \{a(hx) + b(hy) + c(hz)\}/T = h(ax + by + cz)/T \quad \text{Expression 13}$$

Since the R-phase pulse width x is T|a|, the S-phase pulse width y is T|b|, and the T-phase pulse width z is T|c|, Expression 13 may be expressed as Expression 14.

$$\text{Average of output voltages in switching cycle } T = h(a^2+b^2+c^2) \quad \text{Expression 14}$$

Further, Expression 14 may be expressed as Expression 15 from $a^2+b^2+c^2=3/2$ in the AC theory.

$$\text{Average of output voltages in switching cycle } T = h \times 3/2 \quad \text{Expression 15}$$

As shown in Expression 15, the average of the output voltages in the switching cycle T may be set to be proportional to the signal level h of the U-phase control signal CSu. That is, the U-phase control signal CSu has an AC waveform (for example, sine wave in the present exemplary embodiment) according to the U-phase AC voltage to be supplied to the load LD. Accordingly, by generating a switching pattern of the bidirectional switch circuit 10 by modulating the AC waveform (for example, sine wave) with a predetermined carrier waveform pattern, it is possible to perform a control so that an AC voltage depending on the U-phase control signal CSu (of sine wave, for example) is output to the load LD from the bidirectional switch circuit 10.

As shown in FIG. 6C, in the mode III, the controller 20 determines a second carrier waveform pattern CW23 including arising saw-tooth wave, a rising saw-tooth wave, and a falling saw-tooth wave in the order of the sections TS31, TS32, and TS33 as the second carrier waveform pattern to be used in the virtual DC/AC conversion process. Further, the controller 20 receives the U-phase control signal CSu from the control signal generator 30, for example. The sections TS31, TS32, and TS33 shown in FIG. 6C correspond to the sections TS31, TS32, TS33 shown in FIG. 4C (that is, the lengths of the sections are the same). However, for ease of illustration, the lengths of the respective sections are shown differently than the lengths in FIG. 4C.

Here, DC voltages of the sections (line voltage generating sections) TS31, TS32, and TS33 in the virtual AC/DC conversion process correspond to an ST voltage (=b−c), a TR voltage (=c−a), and an SR voltage (=b−a), respectively. When a voltage phase having a higher level among two voltage phases in line voltages is a positive side phase and a voltage phase having a lower level is a negative side phase, in the sections (line voltage generating sections) TS31, TS32, and TS33, the S-phase, T-phase and S-phase are the positive side phases, and the T-phase, R-phase, and R-phase are the negative side phases, respectively.

The controller 20 compares the second carrier waveform pattern CW23 with the U-phase control signal CSu. In the section (line voltage generating section) TS31, when the U-phase control signal CSu is disposed on an upper side with reference to the second carrier waveform pattern CW23 (for example, in the case of the first half of the section TS31), the controller 20 selects the positive side phase, that is, the S-phase. Thus, the controller 20 sets the switching signal φSSU which is the S-phase selecting signal to a switch on level, and sets the other switching signals φSRU and φSTU to a switch off level. When the U-phase control signal CSu is disposed on a lower side with reference to the second carrier waveform pattern CW23 (for example, in the case of the second half of the section TS31), the controller 20 selects the negative side phase, that is, the T-phase. Thus, the controller 20 sets the switching signal φSTU which is the T-phase selecting signal to a switch on level, and sets the other switching signals φSRU and φSSU to a switch off level.

In the section (line voltage generating section) TS32, when the U-phase control signal CSu is disposed on an upper side with reference to the second carrier waveform pattern CW23 (for example, in the case of the first half of the section TS32), the controller 20 selects the positive side phase, that is, the T-phase. Thus, the controller 20 sets the switching signal φSSU which is the T-phase selecting signal to a switch on level, and sets the other switching signals φSRU and φSSU to a switch off level. When the U-phase control signal CSu is disposed on a lower side with reference to the second carrier waveform pattern CW23 (for example, in the case of the second half of the section TS32), the controller 20 selects the negative side phase, that is, the R-phase. Thus, the controller 20 sets the switching signal φSRU which is an R-phase selecting signal to a switch on level, and sets the other switching signals φSSU and φSSU to a switch off level.

In the section (line voltage generating section) TS33, when the U-phase control signal CSu is disposed on a lower side with reference to the second carrier waveform pattern CW23 (for example, in the case of the first half of the section TS33), the controller 20 selects the negative side phase, that is, the R-phase. Thus, the controller 20 sets the switching signal φSRU which is an R-phase selecting signal to a switch on level, and sets the other switching signals φSSU and φSTU to a switch off level. When the U-phase control signal CSu is disposed on an upper side with reference to the second carrier waveform pattern CW23 (for example, in the case of the second half of the section TS33), the controller 20 selects the positive side phase, that is, the S-phase. Thus, the controller 20 sets the switching signal φSSU which is the S-phase selecting signal to a switch on level, and sets the other switching signals φSRU and φSTU to a switch off level.

The selecting signals, that is, the switching signals of the respective phases in the mode III will be described. A pulse width of the switching signal φSRU which is the R-phase selecting signal is defined as hx obtained by reducing a pulse width x (see FIG. 4C) of the R-phase pulse in proportion to a signal level h of the U-phase control signal (that is, a signal of which the magnitude varies corresponding to the amplitude of the U-phase voltage) CSu. A pulse width of the switching signal φSSU which is the S-phase selecting signal is defined as by obtained by reducing a pulse width y (see FIG. 4C) of the S-phase pulse in proportion to the signal level h of the U-phase control signal CSu. A pulse width of the switching signal φSTU which is the T-phase selecting signal is defined as hz obtained by reducing a pulse width z (see FIG. 4C) of the T-phase pulse in proportion to the signal level h of the U-phase control signal CSu.

Further, the respective switching signals φSRU, φSSU, and φSTU are alternatively switched on. Accordingly, the R-phase voltage a, the S-phase voltage b, and the T-phase voltage c are generated, respectively, during periods of the pulse widths of the respective switching signals φSRU, φSSU, and φSTU. An average of the DC voltages in the switching cycle T is calculated by integrating the voltages for each period and adding up the integrated voltages, and then, by dividing the result by the switching cycle T, which may be expressed as follows.

Average of output voltages in switching cycle $T =$
$$\{a(hx) + b(hy) + c(hz)\}/T = h(ax + by + cz)/T$$
Expression 16

Since the R-phase pulse width x is T|a|, the S-phase pulse width y is T|b|, and the T-phase pulse width z is T|c|, Expression 16 may be expressed as Expression 17.

Average of output voltages in switching cycle $T = h(a^2+b^2+c^2)$
Expression 17

Further, Expression 17 may be expressed as Expression 18 from $a^2+b^2+c^2=3/2$ in the AC theory.

Average of output voltages in switching cycle $T = h \times 3/2$
Expression 18

As shown in Expression 18, the average of the output voltages in the switching cycle T may be set to be proportional to the signal level h of the U-phase control signal CSu. That is, the U-phase control signal CSu has an AC waveform (for example, sine wave in the present exemplary embodiment) according to the U-phase AC voltage to be supplied to the load LD. Accordingly, by generating a switching pattern of the bidirectional switch circuit 10 by modulating the AC waveform (for example, sine wave) with a predetermined carrier waveform pattern, it is possible to perform a control so that an AC voltage depending on the U-phase control signal CSu (of sine wave, for example) is output to the load LD from the bidirectional switch circuit 10.

As shown in FIG. 6D, in the mode IV, the controller 20 determines a second carrier waveform pattern CW24 including a falling saw-tooth wave, a rising saw-tooth wave, and a falling saw-tooth wave in the order of the sections TS41, TS42, and TS43 as the second carrier waveform pattern to be used in the virtual DC/AC conversion process. Further, the controller 20 receives the U-phase control signal CSu from the control signal generator 30, for example. The sections TS41, TS42, and TS43 shown in FIG. 6D correspond to the sections TS41, TS42, TS43 shown in FIG. 4D (that is, the lengths of the sections are the same). However, for ease of illustration, the lengths of the respective sections are shown differently than the lengths in FIG. 4D.

Here, DC voltages of the sections (line voltage generating sections) TS41, TS42, and TS43 in the virtual AC/DC conversion process correspond to a TS voltage (=c−b), a TR voltage (=c−a), and an SR voltage (=b−a), respectively. When a voltage phase having a higher level among two voltage phases in line voltages is a positive side phase and a voltage phase having a lower level is a negative side phase, in the sections (line voltage generating sections) TS41, TS42, and TS43, the T-phase, T-phase and S-phase are the positive side phases, and the S-phase, R-phase, and R-phase are the negative side phases, respectively.

The controller 20 compares the second carrier waveform pattern CW24 with the U-phase control signal CSu. In the section (line voltage generating section) TS41, when the U-phase control signal CSu is disposed on a lower side with reference to the second carrier waveform pattern CW24 (for example, in the case of the first half of the section TS41), the controller 20 selects the negative side phase, that is, the S-phase. Thus, the controller 20 sets the switching signal φSSU which is the S-phase selecting signal to a switch on level, and sets the other switching signals φSRU and φSTU to a switch off level. When the U-phase control signal CSu is disposed on an upper side with reference to the second carrier waveform pattern CW24 (for example, in the case of the second half of the section TS41), the controller 20 selects the positive side phase, that is, the T-phase. Thus, the controller 20 sets the switching signal φSTU which is the T-phase selecting signal to a switch on level, and sets the other switching signals φSRU and φSSU to a switch off level.

In the section (line voltage generating section) TS42, when the U-phase control signal CSu is disposed on an upper side with reference to the second carrier waveform pattern CW24 (for example, in the case of the first half of the section TS42), the controller 20 selects the positive side phase, that is, the T-phase. Thus, the controller 20 sets the switching signal φSTU which is the T-phase selecting signal to a switch on level, and sets the other switching signals φSRU and φSSU to a switch off level. When the U-phase control signal CSu is disposed on a lower side with reference to the second carrier waveform pattern CW24 (for example, in the case of the second half of the section TS42), the controller 20 selects the negative side phase, that is, the R-phase. Thus, the controller 20 sets the switching signal φSRU which is an R-phase selecting signal to a switch on level, and sets the other switching signals φSSU and φSTU to a switch off level.

In the section (line voltage generating section) TS43, when the U-phase control signal CSu is disposed on a lower side with reference to the second carrier waveform pattern CW24 (for example, in the case of the first half of the section TS43), the controller 20 selects the negative side phase, that is, the R-phase. Thus, the controller 20 sets the switching signal φSRU which is an R-phase selecting signal to a switch on level, and sets the other switching signals φSSU and φSTU to a switch off level. When the U-phase control signal CSu is disposed on an upper side with reference to the second carrier waveform pattern CW24 (for example, in the case of the second half of the section TS43), the controller 20 selects the positive side phase, that is, the S-phase. Thus, the controller 20 sets the switching signal φSSU which is the S-phase selecting signal to a switch on level, and sets the other switching signals φSRU and φSTU to a switch off level.

The selecting signals, that is, the switching signals of the respective phases in the mode IV will be described. A pulse width of the switching signal φSRU which is the R-phase selecting signal is defined as hx obtained by reducing a pulse width x (see FIG. 4D) of the R-phase pulse in proportion to a signal level h of the U-phase control signal (that is, a signal of which the magnitude varies corresponding to the amplitude of the U-phase voltage) CSu. A pulse width of the switching signal φSSU which is the S-phase selecting signal is defined as by obtained by reducing a pulse width y (see FIG. 4D) of the S-phase pulse in proportion to the signal level h of the U-phase control signal CSu. A pulse width of the switching signal φSTU which is the T-phase selecting signal is defined as hz obtained by reducing a pulse width z (see FIG. 4D) of the T-phase pulse in proportion to the signal level h of the U-phase control signal CSu.

Further, since the respective switching signals φSRU, φSSU, and φSTU are alternatively switched on, the R-phase voltage a, the S-phase voltage b, and the T-phase voltage c are generated, respectively, during periods of the pulse widths of the respective switching signals φSRU, φSSU, and φSTU. An average of the DC voltages in the switching cycle T is calculated by integrating the voltages for each period and adding up the integrated voltages, and then, by dividing the result by the switching cycle T, which may be expressed as follows.

Average of output voltages in switching cycle $T =$     Expression 19

$$\{a(hx) + b(hy) + c(hz)\}/T = h(ax + by + cz)/T$$

Since the R-phase pulse width x is T|a|, the S-phase pulse width y is T|b|, and the T-phase pulse width z is T|c|. Expression 19 may be expressed as Expression 20.

Average of output voltages in switching cycle $T=h(a^2+b^2+c^2)$     Expression 20

Further, Expression 20 may be expressed as Expression 21 from $a^2+b^2+c^2=3/2$ in the AC theory.

Average of output voltages in switching cycle $T=h\times 3/2$     Expression 21

As shown in Expression 21, the average of the output voltages in the switching cycle T may be set to be proportional to the signal level h of the U-phase control signal CSu. That is, the U-phase control signal CSu has an AC waveform (for example, sine wave in the present exemplary embodiment) according to the U-phase AC voltage to be supplied to the load LD. Accordingly, by generating a switching pattern of the bidirectional switch circuit 10 by modulating the AC waveform (for example, sine wave) with a predetermined carrier waveform pattern, it is possible to perform a control so that an AC voltage depending on the U-phase control signal CSu (of sine wave, for example) is output to the load LD from the bidirectional switch circuit 10.

As shown in FIG. 6E, in the mode V, the controller 20 determines a second carrier waveform pattern CW25 including a falling saw-tooth wave, a rising saw-tooth wave, and a rising saw-tooth wave in the order of the sections TS51, TS52, and TS53 as the second carrier waveform pattern to be used in the virtual DC/AC conversion process. Further, the controller 20 receives the U-phase control signal CSu from the control signal generator 30, for example. The sections TS51, TS52, and TS53 shown in FIG. 6E correspond to the sections TS51, TS52, TS53 shown in FIG. 4E (that is, the lengths of the sections are the same). However, for ease of illustration, the lengths of the respective sections are shown differently than the lengths in FIG. 4E.

Here, DC voltages of the sections (line voltage generating sections) TS51, TS52, and TS53 in the virtual AC/DC conversion process correspond to a TS voltage (=c−b), a TR voltage (=c−a), and an RS voltage (=a−b), respectively. When a voltage phase having a higher level among two voltage phases in line voltages is a positive side phase and a voltage phase having a lower level is a negative side phase, in the sections (line voltage generating sections) TS51, TS52, and TS53, the T-phase, T-phase and R-phase are the positive side phases, and the S-phase, R-phase, and S-phase are the negative side phases, respectively.

The controller 20 compares the second carrier waveform pattern CW25 with the U-phase control signal CSu. In the section (line voltage generating section) TS51, when the U-phase control signal CSu is disposed on a lower side with reference to the second carrier waveform pattern CW25 (for example, in the case of the first half of the section TS51), the controller 20 selects the negative side phase, that is, the S-phase. Thus, the controller 20 sets the switching signal φSSU which is the S-phase selecting signal to a switch on level, and sets the other switching signals φSRU and φSTU to a switch off level. When the U-phase control signal CSu is disposed on an upper side with reference to the second carrier waveform pattern CW25 (for example, in the case of the second half of the section TS51), the controller 20 selects the positive side phase, that is, the T-phase. Thus, the controller 20 sets the switching signal φSSU which is the T-phase selecting signal to a switch on level, and sets the other switching signals φSRU and φSSU to a switch off level.

In the section (line voltage generating section) TS52, when the U-phase control signal CSu is disposed on an upper side with reference to the second carrier waveform pattern CW25 (for example, in the case of the first half of the section TS52), the controller 20 selects the positive side phase, that is, the T-phase. Thus, the controller 20 sets the switching signal φSSU which is the T-phase selecting signal to a switch on level, and sets the other switching signals φSRU and φSSU to a switch off level. When the U-phase control signal CSu is disposed on a lower side with reference to the second carrier waveform pattern CW25 (for example, in the case of the second half of the section TS52), the controller 20 selects the negative side phase, that is, the R-phase. Thus, the controller 20 sets the switching signal φSRU which is an R-phase selecting signal to a switch on level, and sets the other switching signals φSSU and φSSU to a switch off level.

In the section (line voltage generating section) TS53, when the U-phase control signal CSu is disposed on an upper side with reference to the second carrier waveform pattern CW25 (for example, in the case of the first half of the section TS53), the controller 20 selects the positive side phase, that is, the R-phase. Thus, the controller 20 sets the switching signal φSRU which is an R-phase selecting signal to a switch on level, and sets the other switching signals φSSU and φSTU to a switch off level. When the U-phase control signal CSu is disposed on a lower side with reference to the second carrier waveform pattern CW25 (for example, in the case of the second half of the section TS53), the controller 20 selects the negative side phase, that is, the S-phase. Thus, the controller 20 sets the switching signal φSSU which is the S-phase selecting signal to a switch on level, and sets the other switching signals φSRU and φSTU to a switch off level.

The selecting signals, that is, the switching signals of the respective phases in the mode V will be described. A pulse width of the switching signal φSRU which is the R-phase selecting signal is defined as hx obtained by reducing a pulse width x (see FIG. 4E) of the R-phase pulse in proportion to a signal level h of the U-phase control signal (that is, a signal of which the magnitude varies corresponding to the amplitude of the U-phase voltage) CSu. A pulse width of the switching signal φSSU which is the S-phase selecting signal is defined as by obtained by reducing a pulse width y (see FIG. 4E) of the S-phase pulse in proportion to the signal level h of the U-phase control signal CSu. A pulse width of the switching signal φSTU which is the T-phase selecting signal is defined as hz obtained by reducing a pulse width z (see FIG. 4E) of the T-phase pulse in proportion to the signal level h of the U-phase control signal CSu.

Further, since the respective switching signals φSRU, φSSU, and φSTU are alternatively switched on, the R-phase voltage a, the S-phase voltage b, and the T-phase voltage c are generated, respectively, during periods of the pulse widths of the respective switching signals φSRU, φSSU, and φSTU. An average of the DC voltages in the switching cycle T is calculated by integrating the voltages for each period and adding up the integrated voltages, and then, by dividing the result by the switching cycle T, which may be expressed as follows.

$$\text{Average of output voltages in switching cycle } T = \{a(hx) + b(hy) + c(hz)\}/T = h(ax + by + cz)/T \qquad \text{Expression 22}$$

Since the R-phase pulse width x is T|a|, the S-phase pulse width y is T|b|, and the T-phase pulse width z is T|c|, Expression 22 may be expressed as Expression 23.

$$\text{Average of output voltages in switching cycle } T = h(a^2+b^2+c^2) \qquad \text{Expression 23}$$

Further, Expression 23 may be expressed as Expression 24 from $a^2+b^2+c^2=3/2$ in the AC theory.

$$\text{Average of output voltages in switching cycle } T = h \times 3/2 \qquad \text{Expression 24}$$

As shown in Expression 24, the average of the output voltages in the switching cycle T may be set to be proportional to the signal level h of the U-phase control signal CSu. That is, the U-phase control signal CSu has an AC waveform (for example, sine wave in the present exemplary embodiment) according to the U-phase AC voltage to be supplied to the load LD. Accordingly, by generating a switching pattern of the bidirectional switch circuit 10 by modulating the AC waveform (for example, sine wave) with a predetermined carrier waveform pattern, it is possible to perform a control so that an AC voltage depending on the U-phase control signal CSu (of sine wave, for example) is output to the load LD from the bidirectional switch circuit 10.

As shown in FIG. 6F, in the mode VI, the controller 20 determines a second carrier waveform pattern CW26 including a falling saw-tooth wave, a falling saw-tooth wave, and a rising saw-tooth wave in the order of the sections TS61, TS62, and TS63 as the second carrier waveform pattern to be used in the virtual DC/AC conversion process. Further, the controller 20 receives the U-phase control signal CSu from the control signal generator 30, for example. The sections TS61, TS62, and TS63 shown in FIG. 6F correspond to the sections TS61, TS62, TS63 shown in FIG. 4F (that is, the lengths of the sections are the same). However, for ease of illustration, the lengths of the respective sections are shown differently than the lengths in FIG. 4F.

Here, DC voltages of the sections (line voltage generating sections) TS61, TS62, and TS63 in the virtual AC/DC conversion process correspond to a TS voltage (=c−b), an RT voltage (=a−c), and an RS voltage (=a−b), respectively. When a voltage phase having a higher level among two voltage phases in line voltages is a positive side phase and a voltage phase having a lower level is a negative side phase, in the sections (line voltage generating sections) TS61, TS62, and TS63, the T-phase, R-phase and R-phase are the positive side phases, and the S-phase, T-phase, and S-phase are the negative side phases, respectively.

The controller 20 compares the second carrier waveform pattern CW26 with the U-phase control signal CSu. In the section (line voltage generating section) TS61, when the U-phase control signal CSu is disposed on a lower side with reference to the second carrier waveform pattern CW26 (for example, in the case of the first half of the section TS61), the controller 20 selects the negative side phase, that is, the S-phase. Thus, the controller 20 sets the switching signal φSRU which is the S-phase selecting signal to a switch on level, and sets the other switching signals φSRU and φSRU to a switch off level. When the U-phase control signal CSu is disposed on an upper side with reference to the second carrier waveform pattern CW26 (for example, in the case of the second half of the section TS61), the controller 20 selects the positive side phase, that is, the T-phase. Thus, the controller 20 sets the switching signal φSRU which is the T-phase selecting signal to a switch on level, and sets the other switching signals φSRU and φSRU to a switch off level.

In the section (line voltage generating section) TS62, when the U-phase control signal CSu is disposed on a lower side with reference to the second carrier waveform pattern CW26 (for example, in the case of the first half of the section TS62), the controller 20 selects the negative side phase, that is, the T-phase. Thus, the controller 20 sets the switching signal φSRU which is the T-phase selecting signal to a switch on level, and sets the other switching signals φSRU and φSRU to a switch off level. When the U-phase control signal CSu is disposed on an upper side with reference to the second carrier waveform pattern CW25 (for example, in the case of the second half of the section TS62), the controller 20 selects the positive side phase, that is, the R-phase. Thus, the controller 20 sets the switching signal φSRU which is an R-phase selecting signal to a switch on level, and sets the other switching signals φSSU and φSSU to a switch off level.

In the section (line voltage generating section) TS63, when the U-phase control signal CSu is disposed on an upper side with reference to the second carrier waveform pattern CW26 (for example, in the case of the first half of the section TS63), the controller 20 selects the positive side phase, that is, the R-phase. Thus, the controller 20 sets the switching signal φSRU which is an R-phase selecting signal to a switch on level, and sets the other switching signals φSSU and φSSU to a switch off level. When the U-phase control signal CSu is disposed on a lower side with reference to the second carrier waveform pattern CW25 (for example, in the case of the second half of the section TS63), the controller 20 selects the negative side phase, that is, the S-phase. Thus, the controller 20 sets the switching signal φSSU which is the S-phase selecting signal to a switch on level, and sets the other switching signals φSRU and φSSU to a switch off level.

The selecting signals, that is, the switching signals of the respective phases in the mode VI will be described. A pulse width of the switching signal φSRU which is the R-phase selecting signal is defined as hx obtained by reducing a pulse width x (see FIG. 4F) of the R-phase pulse in proportion to a signal level h of the U-phase control signal (that is, a signal of which the magnitude varies corresponding to the amplitude of the U-phase voltage) CSu. A pulse width of the switching signal φSSU which is the S-phase selecting signal is defined as by obtained by reducing a pulse width y (see FIG. 4F) of the S-phase pulse in proportion to the signal level h of the U-phase control signal CSu. A pulse width of the switching signal φSTU which is the T-phase selecting signal is defined as hz obtained by reducing a pulse width z (see FIG. 4F) of the T-phase pulse in proportion to the signal level h of the U-phase control signal CSu.

Further, the respective switching signals φSRU, φSSU, and φSTU are alternatively switched on. Therefore, the R-phase voltage a, the S-phase voltage b, and the T-phase voltage c are generated, respectively, during periods of the pulse widths of the respective switching signals φSRU, φSSU, and φSTU. An average of the DC voltages in the switching cycle T is calculated by integrating the voltages for each period and adding up the integrated voltages, and then, by dividing the result by the switching cycle T, which may be expressed as follows.

$$\text{Average of output voltages in switching cycle } T = \{a(hx) + b(hy) + c(hz)\}/T = h(ax + by + cz)/T \quad \text{Expression 25}$$

Since the R-phase pulse width x is T|a|, the S-phase pulse width y is T|b|, and the T-phase pulse width z is T|c|, Expression 25 may be expressed as Expression 26.

$$\text{Average of output voltages in switching cycle } T = h(a^2+b^2+c^2) \quad \text{Expression 26}$$

Further, Expression 26 may be expressed as Expression 27 from $a^2+b^2+c^2=3/2$ in the AC theory.

$$\text{Average of output voltages in switching cycle } T = h \times 3/2 \quad \text{Expression 27}$$

As shown in Expression 27, the average of the output voltages in the switching cycle T may be set to be proportional to the signal level h of the U-phase control signal CSu. That is, the U-phase control signal CSu has an AC waveform (for example, sine wave in the present exemplary embodiment) according to the U-phase AC voltage to be supplied to the load LD. Accordingly, by generating a switching pattern of the bidirectional switch circuit 10 by modulating the AC waveform (for example, sine wave) with a predetermined carrier waveform pattern, it is possible to perform a control so that an AC voltage depending on the U-phase control signal CSu (of sine wave, for example) is output to the load LD from the bidirectional switch circuit 10.

In this way, as shown in FIGS. 6A-6F, the switching signals φSRU to φSTU of the bidirectional switches SRU to STU in the bidirectional switch circuit 10 are generated. As shown in FIGS. 6A-6F, the U-phase control signal CSu is modulated with a predetermined carrier waveform pattern so that the respective switching signals φSRU to φSTU are arranged in order. Further, since the pulse width is secured to be longer than the switching time of the switching element, it is possible to suppress a communication failure. In FIGS. 6A-6F, the description is made with respect to the switching signals φSRU to φSTU. However, the description is similarly applied to the switching signals φSRV to φSTV, and φSRW to φSTW of the other bidirectional switches SRV to STV, and SRW to STW.

For example, the switching is performed using the switching signals φSRU to φSTW having switching patterns of sufficiently large pulse widths compared with the switching times of the switching elements (for example, the elements EL1, LE2, EL11, and EL12 shown in FIGS. 2B and 2C).

Next, a principle in which input currents and output voltage can be respectively represented as a three-phase AC waveform (for example, sine wave) will be described.

The virtual AC/DC conversion process shown in FIGS. 4A-4F with respect to each of six modes I to VI shown in FIG. 3 is performed with respect to the input AC power. In the virtual AC/DC conversion process shown in FIGS. 4A-4F, the following conditions 1) and 2) are satisfied.

1) An average of output voltages in each switching cycle is constant at all times.

2) DC currents are distributed to input currents by the ratio of input voltages. Further, when the output power is constant, the input current becomes a three-phase AC waveform (for example, sine wave).

Further, the virtual DC/AC conversion process shown in FIGS. 6A-6F with respect to each of six modes I to VI shown in FIG. 3 is performed with respect to the power subjected to the virtual AC/DC conversion process. It is considered that each of three different types of pulses (R-phase pulse, S-phase pulse, and T-phase pulse) in FIGS. 4A-4F is modulated by an output voltage modulation signal (U-phase control signal, V-phase control signal, and W-phase control signal). For example, when the signal level of the U-phase control signal is set to h (0 to 1), selection widths of three types of sections are hx, hy, and hz, respectively. Accordingly, an average voltage of the carrier sections becomes a(hx)+b(hy)+c(hz))=h(ax+by+cz). Since x=T|a|, y=T|b|, and z=T|c| and ax+by+cz is constant from the above-mentioned condition 1), the average voltage of the carrier sections becomes a voltage proportional to h. The signal level h of the U-phase control signal varies in a three-phase AC waveform (for example, sine wave). Accordingly, the output can be output as the same three-phase AC waveform (for example, sine wave) as the control signal. The distribution of the DC currents will be described. When the pulse widths are x, y, and z, the DC currents are distributed to input currents by the ratio of input voltages. Accordingly, similarly, when the pulse widths are hx, hy, and hz, the DC currents are distributed to input currents by the ratio of input voltages. When the AC voltage by the virtual DC/AC conversion process is constant (for example, when the load is a linear load in a sine wave voltage output), the voltage becomes a three-phase AC waveform (for example, sine wave).

Briefly, the following conditions (1) and (2) are obtained.

(1) The input current in the virtual AC/DC conversion process can be a three-phase AC waveform (for example, sine wave) when the voltage output by the virtual DC/AC conversion process is constant. Normally, the power becomes constant for a short amount of time (about 1 second).

(2) The voltage output by the virtual DC/AC conversion process can be obtained by the same signal as the modulation signal (second control signal).

The conditions (1) and (2) are not satisfied only at a high load as shown in FIGS. 7A-7D, but also at a low load as shown in FIGS. 7E-7H. FIGS. 7A-7D respectively represent waveforms of input voltage, input current, output voltage, and output current of the bidirectional switch circuit 10 at the high load. For example, when comparing FIG. 7B with FIG. 7F, it can be understood that the input current can be represented as the sine wave at both the high load and the low load. Further, for example, when comparing FIG. 7C with FIG. 7G, it can be understood that the output voltage can be represented as the sine wave at both the high load and the low load.

Next, a principle of suppressing the number of times of switching will be described.

As described above, in the virtual DC/AC conversion process, three types of pulses (R-phase pulse, S-phase pulse, and T-phase pulse) on the input side are modulated to the respective phases (U-phase, V-phase, and W-phase) on the output side for every three types of sections in one carrier waveform pattern (switching cycle T).

If one carrier waveform pattern is configured by the same triangular waves for all three types of sections, three instances of switching are necessary for each switching cycle T with respect to each of the bidirectional switches SRU to STW.

On the other hand, in the present exemplary embodiment, as shown in FIGS. 6A-6F, when considering selection of each input voltage phase, the R-, S-, and T-phases appear to overlap with each other in one carrier waveform pattern. That is, each of the plural second carrier waveform patterns CW21 to CW26 shown in FIGS. 6A-6F includes a pattern of which a level varies in a mountain form over two continuous sections among the plural line voltage generating sections. Each of the modes I to VI has plural switching cycles T.

For example, the second carrier waveform pattern CW21 includes a pattern of which a level varies in an upward-mountain form over the section TS11 and the section TS12, and a pattern of which a level varies in a downward-mountain form over the section TS12 and the section TS13.

For example, the second carrier waveform pattern CW22 includes a pattern of which a level varies in an upward-mountain form over the section TS21 and the section TS22, and a pattern of which a level varies in a downward-mountain form over the section TS23 and the section TS21.

For example, the second carrier waveform pattern CW23 includes a pattern of which a level varies in an upward-mountain form over the section TS32 and the section TS33, and a pattern of which a level varies in a downward-mountain form over the section TS33 and the section TS31.

For example, the second carrier waveform pattern CW24 includes a pattern of which a level varies in an upward-mountain form over the section TS42 and the section TS43, and a pattern of which a level varies in a downward-mountain form over the section TS41 and the section TS42.

For example, the second carrier waveform pattern CW25 includes a pattern of which a level varies in an upward-mountain form over the section TS53 and the section TS51, and a pattern of which a level varies in a downward-mountain form over the section TS51 and the section TS52.

For example, the second carrier waveform pattern CW26 includes a pattern of which a level varies in an upward-mountain form over the section TS63 and the section TS61, and a pattern of which a level varies in a downward-mountain form over the section TS62 and the section TS63.

More specifically, when in each of the plural line voltage generating sections, a voltage phase having a larger voltage value among two voltage phases is represented as a positive side phase and a voltage phase having a smaller voltage value among the two voltage phases is represented as a negative side phase, each of the second carrier waveform patterns CW21 to CW26 includes, when there are phases which are common in the positive side phase and the negative side phase in section switching, a pattern of which a level is continuous in a mountain form over two sections to be switched. On the other hand, each of the second carrier waveform patterns CW21 to CW26 includes, when there are phases which are reversed in the positive side phase and the negative side phase in the section switching, a pattern of which a level varies in a saw-tooth form in a boundary between the two sections to be switched.

For example, the second carrier waveform pattern CW21 includes, since there are the T-phases which are common in the negative side phase with respect to the section TS11 and the section TS12, a pattern of which a level varies in an upward-mountain form over the section TS11 and the section TS12. The second carrier waveform pattern CW21 includes, since there are the R-phases which are common in the positive side phase with respect to the section TS12 and the section TS13, a pattern of which a level varies in a downward-mountain form over the section TS12 and the section TS13. The second carrier waveform pattern CW21 includes, since there are the S-phases which are reversed in the positive side phase and the negative side phase with respect to the section TS13 and the section TS11, a pattern of which a level varies in a saw-tooth form in a boundary between the section TS13 and the section TS11.

For example, the second carrier waveform pattern CW22 includes, since there are the T-phases which are common in the negative side phase with respect to the section TS21 and the section TS22, a pattern of which a level varies in an upward-mountain form over the section TS21 and the section TS22. The second carrier waveform pattern CW22 includes, since there are the R-phases which are reversed in the positive side phase and the negative side phase with respect to the section TS22 and the section TS23, a pattern of which a level varies in a saw-tooth form in a boundary between the section TS22 and the section TS23. The second carrier waveform pattern CW22 includes, since there are the S-phases which are common in the positive side phase with respect to the section TS23 and the section TS21, a pattern of which a level varies in a downward-mountain form over the section TS23 and the section TS21.

For example, the second carrier waveform pattern CW23 includes, since there are the T-phases which are reversed in the positive side phase and the negative side phase with respect to the section TS31 and the section TS32, a pattern of which a level varies in a saw-tooth form in a boundary between the section TS31 and the section TS32. The second carrier waveform pattern CW23 includes, since there are the R-phases which are common in the negative side phase with respect to the section TS32 and the section TS33, a pattern of which a level varies in an upward-mountain form over the section TS32 and the section TS33. The second carrier waveform pattern CW23 includes, since there are the S-phases which are common in the positive side phase with respect to the section TS33 and the section TS31, a pattern of which a level varies in a downward-mountain form over the section TS33 and the section TS31.

For example, the second carrier waveform pattern CW24 includes, since there are the T-phases which are common in the positive side phase with respect to the section TS41 and the section TS42, a pattern of which a level varies in a downward-mountain form over the section TS41 and the section TS42. The second carrier waveform pattern CW24 includes, since there are the R-phases which are common in the negative side phase with respect to the section TS42 and the section TS43, a pattern of which a level varies in an upward-mountain form over the section TS42 and the section TS43. The second carrier waveform pattern CW24 includes, since there are the S-phases which are reversed in the positive side phase and the negative side phase with respect to the section TS43 and the section TS41, a pattern of which a level varies in a saw-tooth form in a boundary between the section TS43 and the section TS41.

For example, the second carrier waveform pattern CW25 includes, since there are the T-phases which are common in the positive side phase with respect to the section TS51 and the section TS52, a pattern of which a level varies in an downward-mountain form over the section TS51 and the section TS52. The second carrier waveform pattern CW25 includes, since there are the R-phases which are reversed in the positive side phase and the negative side phase with respect to the section TS52 and the section TS53, a pattern of which a level varies in a saw-tooth form in a boundary between the section TS52 and the section TS53. The second carrier waveform pattern CW25 includes, since there are the S-phases which are common in the negative side phase with respect to the section TS53 and the section TS51, a pattern of which a level varies in an upward-mountain form over the section TS53 and the section TS51.

For example, the second carrier waveform pattern CW26 includes, since there are the T-phases which are reversed in the positive side phase and the negative side phase with respect to the section TS61 and the section TS62, a pattern of which a level varies in a saw-tooth form in a boundary between the section TS61 and the section TS62. The second carrier waveform pattern CW26 includes, since there are the R-phases which are common in the positive side phase with respect to the section TS62 and the section TS63, a pattern of which a level varies in a downward-mountain form over the section TS62 and the section TS63. The second carrier waveform pattern CW26 includes, since there are the S-phases which are common in the negative side phase with respect to the section TS63 and the section TS61, a pattern of which a level varies in an upward-mountain form over the section TS63 and the section TS61.

Further, when a voltage phase having a larger level among two voltage phases in each of the plural line voltage generating sections is represented as the positive side phase, and a voltage phase having a smaller level is represented as the negative side phase, each of the second carrier waveform patterns CW21 to CW26 includes a pattern of which a level is continuous in a mountain form over two modes to be switched, when there are phases which are common in the positive side phase and the negative side phase in mode switching, and includes a pattern of which a level varies in a saw-tooth form in a boundary between the two modes to be switched, when there are phases which are reversed in the positive side phase and the negative side phase in the mode switching.

For example, when the mode I is switched into the mode II, since there are the S-phases which are reversed in the positive side phase and the negative side phase with respect to the section TS13 and the section TS21, the second carrier waveform pattern includes a pattern of which a level varies in a saw-tooth form in a boundary between the section TS13 and the section TS21.

For example, when the mode II is switched into the mode III, since there are the S-phases which are common in the positive side phase with respect to the section TS23 and the section TS31, the second carrier waveform pattern includes a pattern of which a level varies in a downward-mountain form over the section TS23 and the section TS31.

For example, when the mode III is switched into the mode IV, since there are the S-phases which are reversed in the positive side phase and the negative side phase with respect to the section TS33 and the section TS41, the second carrier waveform pattern includes a pattern of which a level varies in a saw-tooth form in a boundary between the section TS33 and the section TS41.

For example, when the mode IV is switched into the mode V, since there are the S-phases which are reversed in the positive side phase and the negative side phase with respect to the section TS43 and the section TS51, the second carrier waveform pattern includes a pattern of which a level varies in a saw-tooth form in a boundary between the section TS43 and the section TS51.

For example, when the mode V is switched into the mode VI, since there are the S-phases which are common in the negative side phase with respect to the section TS53 and the section TS61, the second carrier waveform pattern includes a pattern of which a level varies in an upward-mountain form over the section TS53 and the section TS61.

In this way, by forming one carrier waveform pattern (second carrier waveform pattern) by combining the rising saw-tooth wave and the falling saw-tooth wave, it is possible to perform one-time selection of each phase in each switching cycle T. That is, the maximum voltage phase is necessarily the positive side phase, and the minimum voltage phase is necessarily the negative side phase. The intermediate voltage phase becomes the negative side phase with respect to the maximum voltage phase, and becomes the positive side phase with respect to the minimum voltage phase. As the positive side phase, a period when the second control signal (for example, U-phase control signal) is disposed on an upper side with reference to the second carrier waveform pattern is selected. As the negative side phase, a period when the second control signal (for example, U-phase control signal) is disposed on a lower side with reference to the second carrier waveform pattern is selected. In this case, if the falling saw-tooth wave and the rising saw-tooth wave are continued to form a downward-mountain form, one-time selection of the maximum voltage phase is performed. Further, if the rising saw-tooth wave and the falling saw-tooth wave are continued to form an upward-mountain form, one-time selection of the minimum voltage phase is performed. Thus, it is possible to realize one-time switching for each switching cycle T with respect to each of the bidirectional switches SRU to STW in each mode. Further, in mode switching, it is similarly possible to substantially realize one-time switching for each switching cycle T with respect to each of the bidirectional switches SRU to STW. In other words, it is possible to realize the same control in each mode and in the mode switching. Accordingly, it is possible to reduce fluctuation (fluctuation due to dead time or the like) of the output voltage occurring by disconnection due to the switching, and to reduce shock in the switching point.

Further, the switching signals φSRU to φSTU of the respective bidirectional switches SRU to STU can be maintained to a switching on level over plural line voltage generating sections. Accordingly, as shown in FIGS. 6A-6F, the pulse widths of the switching signals φSRU to φSTU of the bidirectional switches SRU to STU can be widely secured (this is similarly applied to the switching signals φSRV to φSTV and φSRW to φSTW of the bidirectional switches SRV to STV and SRW to STW). That is, the pulse widths can be secured to be large compared with the dead time even at a low load. Accordingly, it is possible to control a distortion factor of a waveform at a low load to be almost the same as at a high load. For example, when comparing FIGS. 7C and 7D (high load) with FIGS. 7G and 7H (low load), it can be understood that the distortion factor of a waveform at a low load can be suppressed at the same level as at a high load.

Next, internal configuration examples of the controller 20 and the control signal generator 30, that is, internal configuration examples for performing the virtual AC/DC conversion process and the virtual DC/AC conversion process will be described. Hereinafter, a first internal configuration example to a third internal configuration example will be described. The process of generating a virtual DC voltage is only a virtual process, and thus, is not actually performed.

The first internal configuration example is shown in FIGS. 8 and 9. In FIG. 8, the second carrier waveform pattern is generated in advance. The second carrier waveform pattern is compared with the second control signal (U-phase control signal CSu, V-phase control signal CSv, and W-phase control signal CSw). Comparison results φUH to φWL and data φP1 to φP18 indicating which section a current section is are output to a circuit shown in FIG. 9. Switching signals φSRU to φSTW of the respective bidirectional switches SRU to STW are generated in the circuit shown in FIG. 9.

Specifically, the controller 20 detects an input voltage by a zero cross detector 21 of 11, and initializes a counter 23 to be started. The counter 23 counts a zero cross point in synchronization with a carrier clock generated by a carrier clock generator 22. A ROM 24 stores data for each second carrier waveform pattern in one switching cycle T of the input voltage. Comparators 25 to 27 and a phase data generator 28 read carrier data from the ROM 24 in a carrier clock unit according to data (first carrier waveform pattern) in the counter 23. Thus, the carrier data (second carrier waveform pattern) for each switching cycle T in FIGS. 6A-6F are outputs to the comparators 25 to 27 and the phase data generator 28.

On the other hand, in the control signal generator 30, a voltage amplitude and phase calculator 31 calculates output voltages to be generated as necessary, that is, a U-phase voltage, a V-phase voltage, and a W-phase voltage to be output to the load LD, and outputs the calculation results to a three-phase waveform generator 32. The three-phase waveform generator 32 generates U-phase, V-phase, and W-phase control signals (second control signals) according to the calculation results, and outputs the generated control signals to the comparators 25 to 27.

In the controller 20, the comparators 25 to 27 compare the U-phase, V-phase, and W-phase control signals with the second carrier waveform pattern, respectively, and output the comparison results φUH, φVH, and φWH to the circuit shown in FIG. 9. The comparison result φUH is an active level (for example, "1") when the U-phase control signal CSu is disposed on an upper side with reference to the second carrier waveform pattern, for example, and is a non-active level (for example, "0") when the U-phase control signal CSu is disposed on a lower side with reference to the second carrier waveform pattern. The comparison result φVH is an active level (for example, "1") when the V-phase control signal CSv is disposed on an upper side with reference to the second carrier waveform pattern, for example, and is a non-active level (for example, "0") when the V-phase control signal CSv is disposed on a lower side with reference to the second carrier waveform pattern. The comparison result φWH is an active level (for example, "1") when the W-phase control signal CSw is disposed on an upper side with reference to the second carrier waveform pattern, for example, and is a non-active level (for example, "0") when the W-phase control signal CSw is disposed on a lower side with reference to the second carrier waveform pattern.

Further, inverters INV1 to INV3 generate the comparison results φUL, φVL, and φWL obtained by logically reversing the comparison results φUH, φVH, and φWH, respectively, and outputs the results to the circuit shown in FIG. 9.

The phase data generator 28 receives the second carrier waveform pattern, and generates the data φP1 to φP18 indicating which section a current section is according to the second carrier waveform pattern and outputs the results to the circuit shown in FIG. 9. For example, when it is recognized that the current section is the section TS11, the phase data generator 28 sets the data φP1 for the section TS11 to an active level (for example, "1"), sets the other data φP2 to φP18 to a non-active level (for example, "0"), and outputs the results to the circuit shown in FIG. 9.

The circuit shown in FIG. 9 performs a logical operation using the comparison results φUH to φWL and the data φP1 to φP18 indicating which section the current section is, for example, and generates the switching signals φSRU to φSTW of the respective bidirectional switches SRU to STW.

For example, a bidirectional switch URP is a bidirectional switch that connects an R-phase to a U-phase. In FIGS. 6A-6F, the R-phase is selected as the positive side phase in the sections TS12, TS13, TS22, TS62, and TS63. In the circuit shown in FIG. 9, the data φP2, φP3, φP5, φP15, φP17, and φP18 for the sections TS12, TS13, TS22, T53, TS62, and TS63 are subjected to an OR-operation by OR gates OR1 to OR3, and the OR operation result and the comparison result φUH are subjected to an AND operation by an AND gate AND1.

Further, in FIGS. 6A-6F, the R-phase is selected as the negative side in the sections TS23, TS32, TS33, TS42, TS43, and TS52. In the circuit shown in FIG. 9, the data φP6, φP8, φP9, φP11, φP12, and φP14 for the sections TS23, TS32, TS33, TS42, TS43 and TS52 are subjected to an OR-operation by OR gates OR4 to OR6, and the OR operation result and the comparison result φUL are subjected to an AND operation by an AND gate AND2.

Further, an output of the AND gate AND1 and an output of the AND gate AND2 are subjected to an OR operation by an OR gate OR7, and the operation result is output to the bidirectional switch URP as a switching signal φURP.

With respect to the above operations, when the OR operation is expressed as + and the AND operation is expressed as *, the switching signal φURP is expressed as the following expression 28.

$$\varphi URP = \varphi UH^*(\varphi P2 + \varphi P3 + \varphi P5 + \varphi P15 + \varphi P17 + \varphi P18) + \varphi UL^*(\varphi P6 + \varphi P8 + \varphi P9 + \varphi P11 + \varphi P12 + \varphi P14) \quad \text{Expression 28}$$

Similarly, the following expressions 29 to 36 are obtained.

$$\varphi VRP = \varphi VH^*(\varphi P2 + \varphi P3 + \varphi P5 + \varphi P15 + \varphi P17 + \varphi P18) + \varphi VL^*(\varphi P6 + \varphi P8 + \varphi P9 + \varphi P11 + \varphi P12 + \varphi P14) \quad \text{Expression 29}$$

$$\varphi WRP = \varphi WH^*(\varphi P2 + \varphi P3 + \varphi P5 + \varphi P15 + \varphi P17 + \varphi P18) + \varphi WL^*(\varphi P6 + \varphi P8 + \varphi P9 + \varphi P11 + \varphi P12 + \varphi P14) \quad \text{Expression 30}$$

$$\varphi USP = \varphi UH^*(\varphi P1 + \varphi P4 + \varphi P6 + \varphi P7 + \varphi P9 + \varphi P12) + \varphi UL^*(\varphi P3 + \varphi P10 + \varphi P13 + \varphi P15 + \varphi P16 + \varphi P18) \quad \text{Expression 31}$$

$$\varphi VSP = \varphi VH^*(\varphi P1 + \varphi P4 + \varphi P6 + \varphi P7 + \varphi P9 + \varphi P12) + \varphi VL^*(\varphi P3 + \varphi P10 + \varphi P13 + \varphi P15 + \varphi P16 + \varphi P18) \quad \text{Expression 32}$$

$$\varphi WSP = \varphi WH^*(\varphi P1 + \varphi P4 + \varphi P6 + \varphi P7 + \varphi P9 + \varphi P12) + \varphi WL^*(\varphi P3 + \varphi P10 + \varphi P13 + \varphi P15 + \varphi 16 + \varphi P18) \quad \text{Expression 33}$$

$$\varphi UTP = \varphi UH^*(\varphi P8 + \varphi P10 + \varphi P11 + \varphi P13 + \varphi P14 + \varphi P16) + \varphi UL^*(\varphi P1 + \varphi P2 + \varphi P4 + \varphi P5 + \varphi P7 + \varphi P17) \quad \text{Expression 34}$$

$$\varphi VTP = \varphi VH^*(\varphi P8 + \varphi P10 + \varphi P11 + \varphi P13 + \varphi P14 + \varphi P16) + \varphi VL^*(\varphi P1 + \varphi P2 + \varphi P4 + \varphi P5 + \varphi P7 + \varphi P17) \quad \text{Expression 35}$$

$$\varphi WTP = \varphi WH^*(\varphi P8 + \varphi P10 + \varphi P11 + \varphi P13 + \varphi P14 + \varphi P16) + \varphi WL^*(\varphi P1 + \varphi P2 + \varphi P4 + \varphi P5 + \varphi P7 + \varphi P17) \quad \text{Expression 36}$$

Expressions 28 to 36 may be considered as expressions indicating the configuration of the circuit shown in FIG. 9.

In the first internal configuration example, the second carrier waveform pattern of one switching cycle is read from the ROM using the zero cross point as a starting point, and the comparison results and 18 section signals are output, as shown in FIG. 8. The signals are combined by the circuit shown in FIG. 9 to switch on or off the bidirectional switch shown in FIG. 1. Thus, an input current becomes a sine wave, and an output voltage becomes a sine wave.

Next, the second internal configuration example will be described.

In the first internal configuration example, the second carrier waveform pattern to be compared with the second control signals CSu to CSw is prepared in advance as ROM data. However, since the ROM data is data for each carrier block, the capacity of the ROM increases.

Thus, in the second internal configuration example, data on the second carrier waveform pattern to be compared with the second control signals CSu to CSw is generated by a circuit, and thus, the capacity of the ROM is reduced.

Specifically, a sine wave ROM 121 shown in FIG. 10 stores sine wave data. A comparator 122 compares the data (first carrier waveform pattern) in the counter 23 with the sine wave data read from the sine wave ROM 121 to measure time. A carrier waveform generator 123 operates a slope from a measurement value measured by the comparator 122. Further, the carrier waveform generator 123 generates a carrier waveform (second carrier waveform pattern) to be compared with the second control signals CSu to CSw.

In the second internal configuration example, time measurement of switching points is performed by the comparator 122, and then, the second carrier waveform pattern is generated. Then, the second control signals are compared with the second carrier waveform pattern. The signals are combined by the circuit shown in FIG. 9 to switch on or off the bidirectional switch shown in FIG. 1. Thus, an input current becomes a sine wave, and an output voltage becomes a sine wave.

Next, the third internal configuration example will be described.

The third internal configuration example is shown in FIG. 11. In the controller 20, the comparator 122 compares the data (first carrier waveform pattern) in the counter 23 with the sine wave data read from the sine wave ROM 121 to obtain 3 sections in the switching cycle T through an operation, and outputs the results to multipliers 221-1 to 221-9.

Each of the multipliers 221-1 to 221-3 multiplies data in a corresponding section among three sections in the switching cycle T by the U-phase control signal CSu. The multipliers 221-1 to 221-3 output the multiplication results to comparators 223-1 to 223-3, respectively.

Each of the multipliers 221-4 to 221-6 multiplies data in a corresponding section among the three sections in the switching cycle T by the V-phase control signal CSv. The multipliers 221-4 to 221-6 output the multiplication results to comparators 223-4 to 223-6, respectively.

Each of the multipliers 221-7 to 221-9 multiplies data in a corresponding section among the three sections in the switching cycle T by the W-phase control signal CSw. The multipliers 221-7 to 221-9 output the multiplication results to comparators 223-7 to 223-9, respectively.

A counter 222 integrates carrier clocks generated by the carrier clock generator 22 according to the data in the three sections in the switching cycle T. The counter 222 outputs the integrated values of the carrier clocks to the comparators 223-1 to 223-9.

The comparators 223-1 to 223-3 compare the multiplication results of the multipliers 221-1 to 221-3 with the integrated values of the carrier clocks. The comparators 223-1 to 223-3 output the comparison results to a combiner 224-1. The combiner 224-1 combines the comparison results with the data φP1 to φP18 for the respective sections, and outputs the combined comparison result φUH to the circuit shown in FIG. 9.

The comparators 223-4 to 223-6 compare the multiplication results of the multipliers 221-4 to 221-6 with the integrated values of the carrier clocks. The comparators 223-4 to 223-6 output the comparator results to a combiner 224-2. The combiner 224-2 combines the comparator results with the data φP1 to φP18 for the respective sections, and outputs the combined comparator result φVH to the circuit shown in FIG. 9.

The comparators 223-7 to 223-9 compare the multiplication results of the multipliers 221-7 to 221-9 with the integrated values of the carrier clocks. The comparators 223-7 to 223-9 output the comparator results to a combiner 224-3. The combiner 224-3 combines the comparator results with the data φP1 to φP18 for the respective sections, and outputs the combined comparator result φWH to the circuit shown in FIG. 9.

In the third internal configuration example, time measurement of switching points is performed by the comparator 122, and then, the second control signals are multiplied by numerical values obtained by the time measurement. Then, the second control signals in which the times are reflected are compared with integrated times of the carrier clocks, and the comparison results are output.

That is, in the second internal configuration example, the comparison is performed based on the second control signal level, but in the third internal configuration example, the second control signal is changed to the value in the time region, and then, the comparison is performed based on the time region. The second internal configuration example and the third internal configuration example are different in the comparison methods, but have the same comparison results. Further, the comparison results and the 18 section signals are output. The signals are combined by the circuit shown in FIG. 9 to switch on or off the bidirectional switch shown in FIG. 1. Thus, an input current becomes a sine wave, and an output voltage becomes a sine wave.

As described above, in the exemplary embodiment, the controller 20 performs the different virtual AC/DC conversion processes according to the plural modes I to VI divided depending on the magnitude correlation between the respective phase voltages in the input three-phase AC power, with respect to the input three-phase AC power. Further, the controller 20 generates the switching patterns of the bidirectional switch circuit 10 so as to perform the different virtual DC/AC conversion processes according to the plural modes I to VI, with respect to the power subjected to the virtual AC/DC conversion processes. Specifically, the controller 20 performs the virtual AC/DC conversion processes using the different first carrier waveform patterns CW11 to CW13 (see FIGS. 4A-4F) according to the plural modes I to VI, with respect to the input three-phase AC power. In addition, the controller 20 generates the switching patterns of the bidirectional switch circuit 10 so as to perform the virtual DC/AC conversion processes using the different second carrier waveform patterns CW21 to CW26 (see FIGS. 6A-6F) according to the plural modes I to VI, with respect to the power subjected to the virtual AC/DC conversion processes. Thus, it is possible to directly convert the AC power into the AC power by a simple process without performing a complicated operation such as a matrix operation.

Further, in the exemplary embodiment, the controller 20 compares the first carrier waveform patterns CW11 to CW13 with the first control signals (for example, the modulation waveforms 1, 2A, 2B, and 3 shown in FIGS. 4A-4F) corresponding to the input side phases (R-phase, S-phase, and T-phase) in each of the plural modes I to VI to obtain the plural line voltage generating sections TS11 to TS63. Further, the controller 20 generates the second carrier waveform patterns CW21 to CW26 corresponding to the plural line voltage generating sections TS11 to TS63. In addition, the controller 20 compares the generated second carrier waveform patterns CW21 to CW26 with the second control signals CSu to CSw corresponding to the output side phases (U-phase, V-phase, and W-phase) and generates the switching patterns of the bidirectional switch circuit 10. Thus, it is possible to easily perform the virtual AC/DC conversion processes and the virtual DC/AC conversion processes without performing a complicated matrix operation.

Further, in the exemplary embodiment, the controller 20 recognizes the maximum voltage phase, the minimum voltage phase, and the intermediate voltage phase in the input three-phase AC power. Further, the controller 20 calculates the plural line voltage generating sections during one switching cycle T to be divided into a first section corresponding to the intermediate voltage phase and the minimum voltage phase, a second section corresponding to the maximum voltage phase and the minimum voltage phase, and a third section corresponding to the maximum voltage phase and the intermediate voltage phase. The first section includes the sections TS11, TS22, TS32, TS43, TS53, and TS61 shown in FIGS. 6A-F, for example. The second section includes the sections TS12, TS21, TS33, TS42, TS51, and TS63 shown in FIGS. 6A-F, for example. The third section includes the sections TS13, TS23, TS31, TS41, TS52, and TS62, for example. Accordingly, it is possible to virtually generate three types of line voltages of maximum-minimum, maximum-intermediate, and intermediate-minimum in one switching cycle T, and to make the virtual DC voltages approximately constant by the virtual line voltages using a physical phenomenon such as current subtraction. Thus, it is possible to compare the second carrier waveform patterns with the second control signals prepared in each voltage section based on the approximately constant virtual DC voltages to generate switching signals. Thus, it is possible to form the first control signals and the second control signals into sine waves, respectively, and thus, it is possible to easily form an input current and an output voltage of the matrix converter 1 into sine waves, respectively.

Further, in the exemplary embodiment, the second carrier waveform patterns CW21 to CW26 (see FIGS. 6A-F) include a pattern of which a level varies in a mountain form over two continuous sections among the plural line voltage generating sections. Thus, it is possible to reduce the number of times of switching in each switching cycle T, and thus, it is possible to reduce switching loss of the bidirectional switches SRU to STW in the bidirectional switch circuit 10.

In addition, in the exemplary embodiment, since the second carrier waveform patterns CW21 to CW26 (see FIGS. 6A-F) include the pattern of which the level varies in the mountain form over the two continuous sections among the plural line voltage generating sections, it is possible to easily secure the wide pulse widths of the switching signals φSRU to φSTW of the respective bidirectional switches SRU to STW in the bidirectional switch circuit 10. Thus, for example, it is possible to suppress a distortion factor of a waveform of current or voltage at a low load at the same level as at a high load. Thus, since it is possible to reduce communication failure, and thus, it is possible to suppress breakage of the load LD (for example, a motor, an actuator, or the like). Further, is possible to enhance the power conversion efficiency.

Further, in the exemplary embodiment, the controller 20 recognizes the maximum voltage phase, the minimum voltage phase, and the intermediate voltage phase in the input three-phase AC power. Further, when a voltage phase having a larger level among two voltage phases is represented as a positive side phase and a voltage phase having a smaller level among the two voltage phases is represented as a negative side phase, in each of the plural line voltage generating sections, each of the second carrier waveform pattern CW21 to CW26 generated by the controller 20 includes, when there are phases which are common in the positive side phase and the negative side phase in mode switching, a pattern of which a level is continuous in a mountain form over two modes to be switched, and includes, when there are phases which are reversed in the positive side phase and the negative side phase in the mode switching, a pattern of which a level varies in a saw-tooth form in a boundary between the two modes to be switched. Thus, even in the mode switching, it is possible to substantially realize one-time switching for each switching cycle T with respect to each of the bidirectional switches SRU to STW. In other words, it is possible to realize the same control in each mode and in the mode switching, and thus, it is possible to reduce shock of the switching point.

Further, in the exemplary embodiment, since the zero cross point of the input AC voltage is calculated to estimate the input AC voltage of each phase using the zero cross point as a synchronization signal, it is possible to simply achieve a matrix converter, compared with a case where the input AC voltage of each phase is detected.

Further, in the exemplary embodiment, the second control signals can be input without being operated with other physical quantities. Thus, it is possible to form the second control signals in a similar way to the AC power to be supplied to the load, and thus, it is possible to easily form an output voltage into a sine wave.

In the above-described exemplary embodiment, the AC power of one phase in the input three-phase AC power is detected, the zero cross point of the detected AC power is calculated, and the AC voltage of each phase on the input side is estimated using the zero cross point as a starting point, but the input three-phase AC power may be individually detected in order to be recognized.

INDUSTRIAL APPLICABILITY

As described above, the matrix converter according to the exemplary embodiment of the invention is useful in direct conversion of three-phase AC power to three-phase AC power.

REFERENCE SIGNS LIST

1: MATRIX CONVERTER
10: BIDIRECTIONAL SWITCH CIRCUIT
20: CONTROLLER
30: CONTROL SIGNAL GENERATOR
40: THREE-PHASE REACTOR
50: INPUT CAPACITOR
LD: LOAD
PS: THREE-PHASE AC POWER SUPPLY

The invention claimed is:

1. A matrix converter that directly converts input three-phase AC power into three-phase AC power and outputs the converted three-phase AC power to a load, the matrix converter comprising:
a bidirectional switch circuit that switches on and off a supply of the input three-phase AC power to the load; and
a controller that generates switching patterns of the bidirectional switch circuit;
wherein the controller:
performs virtual AC/DC conversion processes, wherein:
the input three-phase AC power is divided into a plurality of modes based on magnitude relationships between respective phase voltages, with each period between changes in the magnitude relationships defined as one switching cycle of the bidirectional switch circuit,
based on a maximum voltage phase, a minimum voltage phase, and an intermediate voltage phase of the input three-phase AC power in one switching cycle, determining a plurality of line voltage sections each being one switching cycle where two voltage phases are selected, including:
a first section where the intermediate voltage phase and the minimum voltage phase are selected,
a second section where the maximum voltage phase and the minimum voltage phase are selected, and
a third section where the maximum voltage phase and the intermediate voltage phase are selected; and
performs virtual DC/AC conversion processes, including:
selecting the intermediate voltage phase and the minimum voltage phase of the input three-phase AC power in the first section determined in the virtual AC/DC conversion processes,
selecting the maximum voltage phase and the minimum voltage phase of the input three-phase AC power in the second section determined in the virtual AC/DC conversion processes,
selecting the maximum voltage phase and the intermediate voltage phase of the input three-phase AC power in the third section determined in the virtual AC/DC conversion processes, and
generating switching patterns of the bidirectional switch circuit in each section by providing line voltages of the two selected phases as virtual DC voltages.

2. The matrix converter according to claim 1, wherein the second carrier waveform pattern includes a pattern of which a level varies in a mountain form over two continuous sections among the plurality of line voltage generating sections.

3. The matrix converter according to claim 1, wherein when a voltage phase having a larger voltage value among two voltage phases for each of the plural line voltage generating sections is represented as a positive side phase and a voltage phase having a smaller voltage value among the two voltage phases is represented as a negative side phase, the second carrier waveform pattern includes, when there are phases which are common in the positive side phase and the negative side phase in mode switching, a pattern of which a level is continuous in a mountain form over two modes to be switched, and includes, when there are phases which are reversed in the positive side phase and the negative side phase in the mode switching, a pattern of which a level varies in a saw-tooth form in a boundary between the two modes to be switched.

4. The matrix converter according to claim 2, wherein when a voltage phase having a larger voltage value among two voltage phases for each of the plural line voltage generating sections is represented as a positive side phase and a voltage phase having a smaller voltage value among the two voltage phases is represented as a negative side phase, the second carrier waveform pattern includes, when there are phases which are common in the positive side phase and the negative side phase in mode switching, a pattern of which a level is continuous in a mountain form over two modes to be switched, and includes, when there are phases which are reversed in the positive side phase and the negative side phase in the mode switching, a pattern of which a level varies in a saw-tooth form in a boundary between the two modes to be switched.

5. The matrix converter according to claim 1,
wherein the controller generates the switching patterns of the bidirectional switch circuit so as to perform the virtual AC/DC conversion processes with respect to the input three-phase AC power using different first carrier waveform patterns according to the plurality of modes, to select two phases from the input three-phase AC power, and to perform the virtual DC/AC conversion processes with respect to the line voltages of the two selected phases using different second carrier waveform patterns according to the plurality of modes.

6. The matrix converter according to claim 5,
wherein in each of the plurality of modes, the controller, as the virtual AC/DC conversion processes, calculates a plurality of line voltage generating sections from the result of comparing the first carrier waveform patterns and first control signals corresponding to input side phases, and as the virtual DC/AC conversion processes, generates the second carrier waveform patters corresponding to the plurality of line voltage generating sections, and generates the switching patterns of the bidirectional switch circuit from the result of comparing the generated second carrier waveform patterns and second control signals corresponding to the output side phases.

7. The matrix converter according to claim 1,
wherein in each of the plurality of modes, the controller:
as the virtual AC/DC conversion processes, calculates the plurality of line voltage generating sections from the result of comparing different first carrier waveform patterns according to the plurality of modes and first control signals corresponding to input side phases, and
as the virtual DC/AC conversion processes, generates second carrier waveform patterns corresponding to the plurality of line voltage generating sections and the plurality of modes, and generates the switching patterns of the bidirectional switch circuit from the result of comparing the generated second carrier waveform patterns and second control signals corresponding to the output side phases.

* * * * *